United States Patent [19]
Fujikawa et al.

[11] Patent Number: 5,909,264
[45] Date of Patent: Jun. 1, 1999

[54] LCD DEVICE HAVING A SWITCHING ELEMENT WITH REDUCED SIZE AND CAPACITANCE AND METHOD FOR FABRICATING THE SAME

[75] Inventors: Yohsuke Fujikawa, Tenri; Yoshihisa Ishimoto, Sakai; Toshiyuki Yoshimizu, Soraku-gun; Toshiaki Fukuyama, Nara, all of Japan

[73] Assignee: Sharp Kabushiki Kaisha, Osaka, Japan

[21] Appl. No.: 08/825,671

[22] Filed: Mar. 20, 1997

[30] Foreign Application Priority Data

Mar. 21, 1996 [JP] Japan ................................ 8-065031
Jan. 17, 1997 [JP] Japan ................................ 9-007048

[51] Int. Cl.⁶ .......................... G02F 1/135; G02F 1/136
[52] U.S. Cl. ............................ 349/49; 349/51; 349/52
[58] Field of Search ........................... 349/49, 51, 52

[56] References Cited

U.S. PATENT DOCUMENTS

| | | | |
|---|---|---|---|
| 5,236,573 | 8/1993 | Shannon | 205/122 |
| 5,442,224 | 8/1995 | Yoshimuzi et al. | 349/51 |
| 5,539,549 | 7/1996 | Kishida et al. | 359/58 |
| 5,568,289 | 10/1996 | Kishida et al. | 359/58 |
| 5,734,452 | 3/1998 | Yamaue et al. | 349/49 |

FOREIGN PATENT DOCUMENTS

| | | |
|---|---|---|
| 1-270027 | 10/1989 | Japan. |
| 3-160420 | 7/1991 | Japan. |
| 4-367827 | 12/1992 | Japan. |
| 5-119353 | 5/1993 | Japan. |

*Primary Examiner*—William L. Sikes
*Assistant Examiner*—Tarifur R. Chowdhury
*Attorney, Agent, or Firm*—Nixon & Vanderhye P.C.

[57] ABSTRACT

The liquid crystal display device of the invention includes a pair of substrates and a liquid crystal layer sandwiched between the pair of substrates. A plurality of pixel electrodes is arranged in matrix on the surface facing the liquid crystal layer of at least one of the pair of substrates. A plurality of signal lines and a plurality of two-terminal nonlinear elements are formed. An individual one of the two-terminal nonlinear elements is connected to one of the pixel electrodes associated with the individual two-terminal nonlinear element and one of the signal lines associated with the individual two-terminal nonlinear element. The two-terminal nonlinear element includes: a lower electrode connected to the associated signal line, an insulator formed so as to cover the lower electrode, and an upper electrode connected to the associated pixel electrode. The insulator includes a first insulating film exhibiting non-linearity, a second insulating film formed so as to cover etching edges of the lower electrode, and a slit electrically connecting the upper electrode to the first insulating film. The size of the two-terminal nonlinear element is determined by an opening width of the slit of the second insulating film and a line width of the upper electrode.

19 Claims, 28 Drawing Sheets

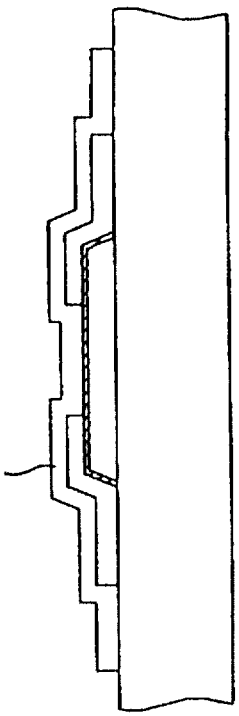
FIG.9A
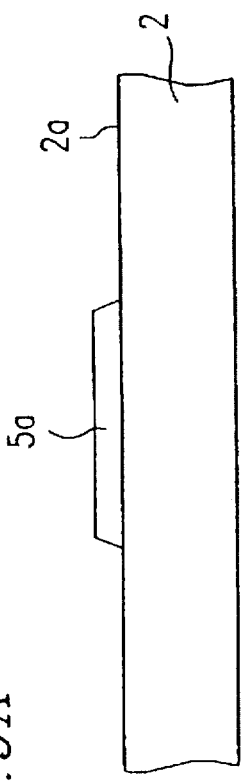
FIG.9B
FIG.9C
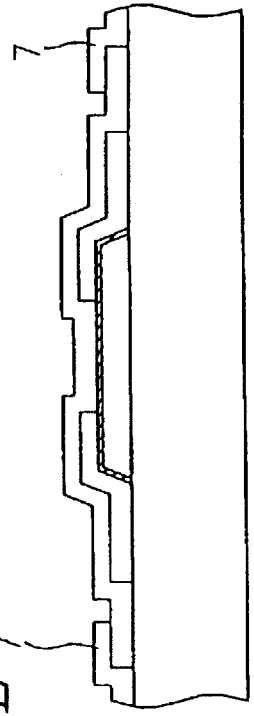
FIG.9D
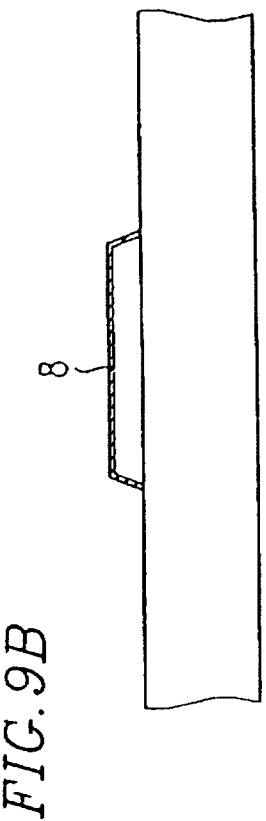
FIG.9E

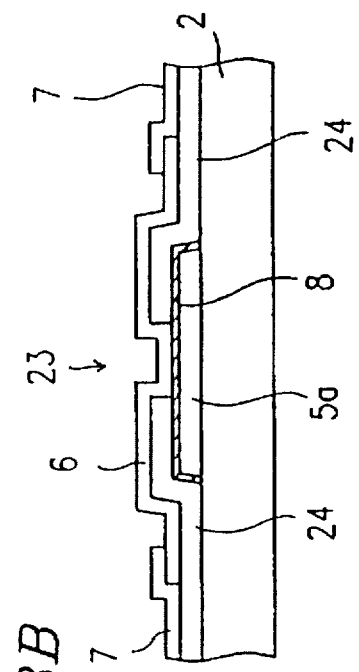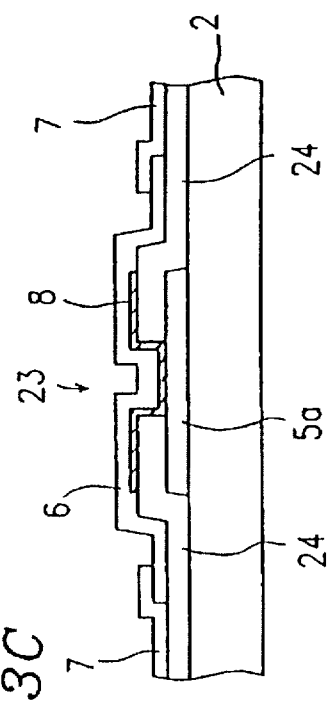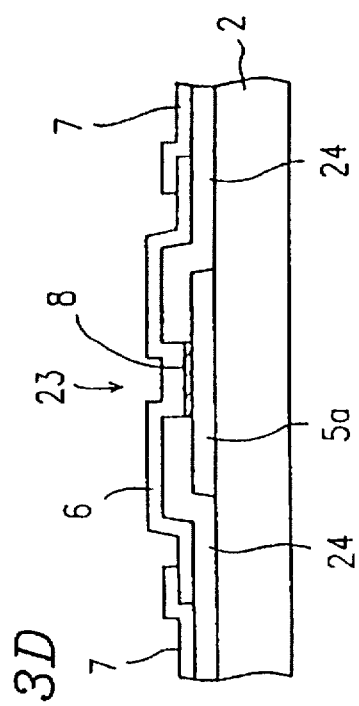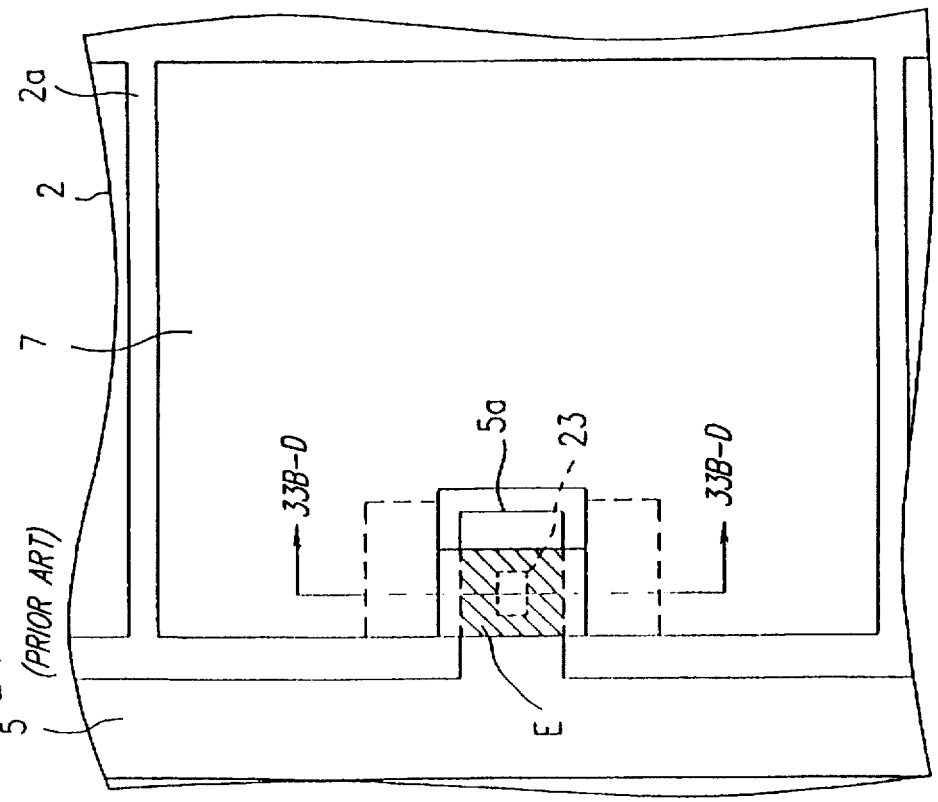
FIG. 33A (PRIOR ART)
FIG. 33B (PRIOR ART)
FIG. 33C (PRIOR ART)
FIG. 33D (PRIOR ART)

LCD DEVICE HAVING A SWITCHING ELEMENT WITH REDUCED SIZE AND CAPACITANCE AND METHOD FOR FABRICATING THE SAME

BACKGROUND OF THE INVENTION

1. Field of the Invention

The present invention relates in general to a switching element. More particularly, the present invention relates to a two-terminal nonlinear element as an exemplary switching element, a liquid crystal display device including such an element and a method for fabricating the same.

2. Description of the Related Art

In recent years, liquid crystal display devices have been used for display applications in personal computers, word processors, office automation terminal units, television receivers and the like, because a liquid crystal display device is a small-sized light-weight device consuming little power. As liquid crystal display devices become more and more popular, it becomes more and more necessary for them to display an image of higher quality and to increase the display capacity thereof.

A conventional liquid crystal display device has been driven in a simple matrix manner by a voltage averaging method in Twisted Nematic (TN) mode or Super Twisted Nematic (STN) mode. However, since such a method requires a larger number of scanning lines, the contrast ratio thereof may become unsatisfactory. Thus, such a method is not suitable for large-capacity display.

In order to deal with such a problem, active driving has been developed by providing a switching element for each of the pixels on a display screen. Switching elements used for such a purpose include thin-film transistors and two-terminal nonlinear elements. Comparing these two types of elements, the two-terminal nonlinear elements are more advantageous in respects of the simplified configuration and the reduced fabrication costs thereof. Thus, a liquid crystal display device using such two-terminal nonlinear elements is expected to be a mainstream product in the near future. Reflecting these tendencies, a nonlinear element having a metal-insulator-metal structure (hereinafter, such an element will be simply referred to as an "MIM element") has already been in practical use.

The MIM element exhibits current-voltage characteristics following a so-called Poole-Frenkel rule. More specifically, when the voltage of an input signal is low, the resistance of such an element becomes high. On the other hand, when the voltage of the input signal is sufficiently high for driving liquid crystal molecules, the resistance of such an element becomes low.

In a liquid crystal display device including the MIM elements, such nonlinear current-voltage characteristics are applied to switching the ON/OFF states of the elements.

FIG. 23 is a plan view of a conventional liquid crystal display device 1 including MIM elements. In FIG. 23, a substrate 2 on which MIM elements are formed (hereinafter, such a substrate will be referred to as an "element substrate") in the figure, while a substrate 3 on which counter electrodes are formed (hereinafter, such a substrate will be referred to as a "counter substrate"), wherein the substrate 3 overlaps the substrate 2. This liquid crystal display device 1 is a reflective liquid crystal display device having a so-called H-VGA pixel arrangement of 480 dots (H)×320 dots (V) for displaying a monochromatic image.

FIG. 24 is a plan view showing a pixel formed at an arbitrary position A (see FIG. 23) on the element substrate 2 within a display region of the liquid crystal display device 1. FIG. 25 is a plan view of the counter substrate 3 to be opposed to the element substrate 2. FIG. 26 is a cross-sectional view of the liquid crystal display device 1 taken along the line 26—26 shown in FIG. 24.

As shown in FIG. 24, one pixel includes: a pixel electrode 7 formed on the surface 2a of the element substrate 2 made of glass or the like; a signal line 5; and an MIM element 4. Each of the signal lines 5 is connected to an associated element terminal 15 formed at the end of the element substrate 2. On the other hand, each of the counter electrodes 9 formed in a stripe shape on the surface 3a of the counter substrate 3 so as to cross the signal lines 5 at a right angle, is connected to an associated counter terminal 16 formed at the end of the counter substrate 3. The liquid crystal display device 1 is driven by applying a signal waveform to the element terminals 15 and the counter terminals 16.

Moreover, the MIM element 4 shown by cross-hatching in FIG. 24 should be designed so as to have a capacitance represented by an appropriate capacitance ratio with respect to the capacitance of the liquid crystal layer. A standard MIM element 4 is generally designed such that the ratio of the capacitance of the liquid crystal layer to that of the element 4 becomes approximately 10:1.

The lower electrode of the MIM element 4 is made of a material such as tantalum (Ta); the upper electrode thereof is made of titanium (Ti), aluminum (Al), chromium (Cr) or the like; and t,e insulating film thereof is made of tantalum oxide ($TaO_x$), for example.

An exemplary method for fabricating the element substrate 2,will be described with reference to FIGS. 27A to 27D showing the cross section of the MIM element 4.

First, a Ta thin film is deposited on the surface 2a of the element substrate 2 made of glass or the like, by a sputtering method and then patterned by a photolithography method, thereby forming a signal line 5 and a lower electrode 5a (FIG. 27A).

Next, an insulating film 8 made of $TaO_x$ is formed on the Ta thin film by an anodization method or the like (FIG. 27B).

Subsequently, a thin film made of Ti or the like, is formed over the substrate 2, thereby forming a pattern for an upper electrode 6 (FIG. 27C).

Finally, a thin film made of a transparent conductive material such as indium-tin-oxide (ITO) is further formed thereon and then patterned by a photolithography method, thereby forming a pixel electrode 7 (FIG. 27D).

In such a configuration, the insulating film 8 exhibits nonlinear resistance properties and the MIM element 4 is formed at a site where the lower electrode 5a, the insulating film 8 and the upper electrode 6 are stacked.

As shown in FIG. 26, in order to control the orientations of liquid crystal molecules 14, an alignment film 10 (e.g., a polyimide film) is formed on the glass substrate (element substrate) 2 on which the MIM elements 4 are formed for the respective pixels, and the alignment film 10 is subjected to a rubbing treatment.

On the other hand, an alignment film 11 is also formed over the counter substrate 3 with the counter electrodes 9 formed on the surface 3a thereof. The alignment film 11 is subjected to a rubbing treatment in a direction perpendicular to the rubbing direction of the alignment film 10 of the element substrate 2.

The element substrate 2 and the counter substrate 3 are attached to each other via a seal member 17 (see FIG. 23) such that the alignment films 10 and 11 face each other and that a gap of about 10 μm is provided therebetween. Next, liquid crystal material is injected into the gap and then sealed, thereby forming a liquid crystal cell.

Finally, as shown in FIG. 26, polarizers 12 and 13 are disposed on the outer surfaces of the liquid crystal cell (i.e., on the outer surface of the element substrate 2 and that of the counter substrate 3, respectively) such that the polarization axis of the polarizer 12 is perpendicular to that of the polarizer 13, thereby completing the liquid crystal display device 1. Herein, a polarizer with a reflector is used as the polarizer 12.

However, if a transmission type polarizer is attached as the polarizer 12 onto the outer surface of the element substrate 2 and a back light is provided, then a transmission type liquid crystal display device can be obtained. Furthermore, if a micro color filter layer is formed on the counter substrate 3, then color display can be performed.

Herein, the reflective liquid crystal display device 1 performs display by reflecting the externally incident light. Since a back light is unnecessary, the power consumption, the size and the weight of such a liquid crystal display device can be reduced. Thus, a reflective liquid crystal display device is expected to be widely used as a display device for portable information terminal units. A high-resolution large-capacity reflective liquid crystal display device allowing for the display of a so-called "paper white" type bright image is particularly suitable as a display device for portable information terminal units.

However, in such a reflective liquid crystal display device 1, since the incident light is absorbed by the polarizer 13, the reflectance thereof is generally decreased to about 50% or less. Thus, the brightness realized by such a liquid crystal display device is unsatisfactory.

In order to solve such a problem, liquid crystal display devices operating in a display mode in which the entire incident light can be efficaciously utilized without using polarizers have been proposed. Such liquid crystal display devices include, for example, a phase-change type liquid crystal display device operating in Guest Host (GH) mode.

FIG. 28 is a plan view showing the element substrate 2 of a phase-change type liquid crystal display device operating in GH mode. FIG. 29 is a plan view of the counter substrate 3 thereof. FIG. 30 is a cross-sectional view of the liquid crystal display device taken along the line 30—30 shown in FIG. 28.

It is noted that the basic planar configuration of the liquid crystal display device is similar to that shown in FIG. 23. Since this liquid crystal display device also has a similar H-VGA arrangement, the plan view thereof will not be depicted. However, in this liquid crystal display device, micro color filters 18a for cyan and micro color filters 18b for red are alternately provided in a checkerboard pattern on the counter substrate 3 for performing color display. Thus, the number of the element terminals necessary for the liquid crystal display device of this type becomes twice as large as that of the reflective liquid crystal display device: that is to say, 480×2=960.

In this liquid crystal display device, the pixel electrodes 7 also function as a reflector. In order to improve the luminance and the contrast ratio of the liquid crystal display device, the pixel electrodes 7 are formed on the upper surface of an organic insulating layer 19 on which uneven portions (i.e., the circles of various sizes drawn by the solid lines in FIG. 28) are formed. As a result, the upper surface of the pixel electrodes 7 becomes a diffusive reflective surface having a high reflectance. In other words, the reflector formed on the outer surface of the liquid crystal cell in the conventional reflective liquid crystal display device shown in FIG. 23 is formed inside the liquid crystal cell in the GH mode liquid crystal display device. The pixel electrodes functioning as a reflector is made of aluminum (Al) or the like.

Moreover, the upper electrode 6 of the MIM element 4 is electrically connected to a corresponding pixel electrode 7 via a through hole 20 provided through the organic insulating layer 19.

The ON/OFF states of the display are switched by controlling the orientation states of the Guest Host liquid crystal molecules including dichroic dyes upon an application of a voltage to the gap between the pixel electrodes 7 and the counter electrodes 9. As shown in FIG. 30, the molecules 21 of the dichroic dyes tend to be aligned with the liquid crystal molecules 22. Thus, when a voltage is applied to the liquid crystal layer, the liquid crystal molecules 22 and the dichroic dye molecules 21 are arranged in a direction substantially vertical to the inward surfaces of the substrates so that the light incident from above the counter substrate 3 is passed through the liquid crystal layer without being absorbed into the dichroic dyes, reflected by the pixel electrodes 7 functioning as a reflector, passed through the liquid crystal layer again and then is emitted outward. On the other hand, when no voltage is applied to the liquid crystal layer, the liquid crystal molecules 22 and the dichroic dye molecules 21 are arranged irregularly so that the incident light is absorbed and cut off by the dichroic dye molecules 21. Since bright display (white display) or dark display (black display) is realized by selectively reflecting or cutting off the incident light, respectively, a bright image can be displayed without using any polarizers.

The basic equivalent circuit of such a phase-change type liquid crystal display device is similar to that of the reflective liquid crystal display device shown in FIG. 23. Thus, the phase-change type liquid crystal display device is also designed such that the ratio of the capacitance of the liquid crystal layer to that of the MIM element becomes an appropriate value (about 10:1).

FIG. 31A is an equivalent circuit diagram corresponding to one pixel of the liquid crystal display device using such MIM elements. An MIM element is represented as a parallel circuit formed by a nonlinear resistance $R_{MIM}$ and a capacitance $C_{MIM}$, while the liquid crystal layer is represented as a parallel circuit formed by a resistance $R_{LC}$ and a capacitance $C_{LC}$.

FIGS. 31B through 31E illustrate the basic waveforms of driving signals and the variations in voltages applied to the liquid crystal layer along the passage of time.

Assuming that a selection waveform having an amplitude $V_p$ is applied to the scanning lines (the counter electrodes) for a time period $T_{ON}$ every time a cycle T has passed as shown in FIG. 31B and that a data signal determining the display states of the liquid crystal layer is applied to the signal lines (lower electrodes) as shown in FIG. 31C. Then, the waveform of the actually applied voltage is obtained by combining the waveforms shown in FIG. 31B and 31C. Consequently, the waveform of the actually applied voltage becomes the waveform shown in FIG. 31D.

In general, in order to maintain the reliability of the liquid crystal molecules, an alternate current drive is performed by alternately inverting the polarities of the voltages to be applied.

Assuming that a selection voltage is applied to a scanning line (counter electrode), a voltage $(V_P \pm V_D)$ applied to the selected pixel is capacitance divided and a voltage $V_{MIM}$ applied to an MIM element is given by:

$$V_{MIM} = C_{LC}/(C_{LC}+C_{MIM}) \cdot (V_F \pm V_D)$$

If the capacitance $C_{MIM}$ of the MIM element is set to be sufficiently small (i.e., $C_{MIM} \ll C_{LC}$), almost all the voltage is applied to the MIM element. Since the MIM element has nonlinear current-voltage characteristics (i.e., the resistance of the element becomes low when an applied voltage is high), the MIMI element is turned ON so that charge corresponding to the display state is written onto the capacitance $C_{LC}$ of the liquid crystal layer.

When such a selection time $T_{ON}$ terminates at the trailing edge of the selection waveform, $C_{LC}$ and $C_{MIM}$ are capacitance coupled so that the voltage $V_{LC}$ applied to the liquid crystal layer is abruptly decreased by a difference ΔV to be described later (see FIG. 31E). As a result, the voltage $V_{LC}$ is continuously discharged via the OFF resistance of the MIM element until the next selection time starts.

$$\Delta V = C_{MIM}/(C_{LC}+C_{MIM}) \cdot (V_F \pm V_D)$$

The display is performed while repeatedly applying similar signal waveforms from then on. During this display period, the ratio $C_{LC}/C_{MIM}$ of the capacitance CLC of the liquid crystal layer to the capacitance $C_{MIM}$ of the MIM element is desirably as large as possible. This is because if the value of the ratio is small, then a sufficient amount of voltage cannot be applied to the MIM element during the selection time so that the element can not be perfectly turned ON. Furthermore, since the abrupt decrease ΔV of the voltage applied to the liquid crystal layer becomes larger at the trailing edge of the selection waveform, several problems including a decrease in effective voltage applied to the liquid crystal layer are additionally caused. Thus, in order to display a satisfactory image, it is desirable to secure a standard capacitance ratio $C_{LC}/C_{MIM}$ of about 10.

Furthermore, if the capacitance ratio $C_{LC}/C_{MIM}$ becomes different among the respective pixels, then the displayed image becomes adversely non-uniform. Thus, it is necessary to eliminate a variation in capacitances of the MIM elements. If a thin insulating film having non-linearity is formed by an anodization method, then an insulating film having a satisfactorily uniform finish thickness can be obtained. Thus, in such a case, the variation in capacitances of the MIM elements substantially depends upon the finish area of each element. Consequently, in order to prevent an image from being non-uniformly displayed, it is important to fabricate elements of a uniform size.

FIG. 32 is a graph representing a relationship between a ratio of the capacitance $C_{LC}$ of the liquid crystal layer to the capacitance $C_{MIM}$ of the MIM element (hereinafter, simply referred to as a capacitance ratio $C_{LC}/C_{MIM}$) and the contrast ratio of the liquid crystal display device. Exemplary results obtained by measuring the characteristics of a phase-change type reflective liquid crystal display device operating in GH mode are represented in FIG. 32. Liquid crystal display devices having various capacitance ratios of about 5.98, about 7.82, about 10.84, about 12.88 and about 21.68 were modeled by intentionally varying the size (or the area) of an element while setting the electrode area of a pixel (i.e., the capacitance of the liquid crystal layer) to be constant.

The contrast ratio is saturated when the capacitance ratio $C_{LC}/C_{MIM}$ is approximately 10 and tends to decrease as the capacitance ratio $C_{LC}/C_{MIM}$ becomes smaller. The decrease in contrast ratio becomes remarkable particularly when the capacitance ratio $C_{LC}/C_{MIM}$ is smaller than about 8. Thus, it is desirable to secure a capacitance ratio $C_{LC}/C_{MIM}$ of about 8 or more, more preferably about 10.

Moreover, as the capacitance ratio $C_{LC}/C_{MIM}$ becomes smaller, an element cannot be sufficiently turned ON unless the driving voltage is set to be high. Therefore, in view of the breakdown voltage of a driving LSI and the power consumption, a low driving voltage is desirable. Consequently, the capacitance ratio $C_{LC}/C_{MIM}$ is preferably large.

In this case, since the thickness of the insulating film 8 of the MIM element 4 is about 40 nm to about 70 nm, the insulating film 8 has a low electric breakdown voltage and an insulation breakdown is easily caused by the static electricity generated during the fabrication process. As a result, the upper and the lower electrodes of the MIM element 4 are short-circuited and the MIM element can no longer normally function as a switching element. Since a pixel including such a short-circuited MIM element appears as a point defect on the screen, the display definition of the liquid crystal display device is degraded and the fabrication yield of the liquid crystal display device is adversely decreased.

A high-resolution large-capacity liquid crystal display device is required for portable information units in particular. Thus, the number of pixels or elements required for such a liquid crystal display device is necessarily increased. Furthermore, in the case of performing color display, even if the same number of pixels as that of the pixels used for monochromatic display are used, the number of the elements is further increased because a micro color filter layer is additionally provided.

Moreover, if a micro color filter layer is provided, then the point defects are displayed as colored points. As a result, since the point defects become more recognizable, the display definition is disadvantageously decreased. Therefore, it is desirable to suppress such point defects.

Various measures are taken for preventing the generation of static electricity. For example, the humidity during the fabrication process is monitored, and/or a ground or an ionizer is provided for the operator, thereby controlling the environment during the fabrication of a liquid crystal display device. Hc ever, it is currently impossible to completely prevent the insulation breakdown of an MIM element.

In consideration of these circumstances, measures for improving the breakdown voltage itself of an MIM element have also been taken. If the thickness of an insulating film 8 is increased, then it is surely possible to improve the electric breakdown voltage thereof. However, in such a case, the characteristics of such a switching element are deteriorated and the current-voltage characteristics thereof become less abrupt. Thus, the structure of an element has been reexamined instead of increasing the thickness of an insulator.

In an MIM element in general, an insulation breakdown is likely to be generated, because an electric field is likely to be concentrated on an insulator located over the etching edges of a lower electrode pattern or because another insulator has a poor step coverage when the insulator is formed. In an MIM element having a conventional structure, not only the insulator located on a flat portion of a lower electrode but also the insulator located over the etching edges are naturally used as insulators for the MIM element. Thus, the insulation breakdown of the MIM element itself is easily generated. Such an insulation breakdown generated along the periphery of the lower electrode makes defective an image displayed on a liquid crystal display device.

Thus, it has been proposed to further cover the insulator over the etching edges of a lower electrode, in which an insulation breakdown is easily generated, with an intermediate layer having insulation properties. In accordance with such a method, the insulation breakdown of an element is reduced by using only the insulator over the flat portion of the lower electrode as the insulator for an MIM element. MIM elements of this type are described, for example, in Japanese Laid-Open Patent Publications Nos. 1-270027, 3-160420, 4-367827 and 5-119353.

In general, an MIM element having such an intermediate insulating layer is fabricated by performing the steps of: forming a lower electrode; forming an insulator having non-linearity (or a first insulator); forming an intermediate insulating layer (or a second insulator); and forming an upper electrode. A so-called "top contact structure" in which the upper electrode and the lower electrode are connected to the insulator having non-linearity via an aperture-shaped opening (contact hole) provided in a part of the intermediate insulating layer is employed.

FIG. 33A is a plan view showing an MIM element in which a contact hole is provided through such an intermediate insulating layer. FIGS. 33B through 33D are cross-sectional views of the element substrates having various structures taken along the line 33B-D—33B-D shown in FIG. 33A. The cross section may have any of various kinds of layered structures depending upon the methods for fabricating the element. In any case, the cross section is characterized in that the etching edges of the lower electrode 5a are not used as a part of the element.

For example, the element shown in FIG. 33B can be fabricated by performing the following process steps.

First, a lower electrode 5a is formed on the surface of the element substrate 2 and then the surface of the lower electrode 5a is anodized, thereby depositing an insulator 8 having non-linearity thereon.

Next, an intermediate insulating layer 24 is deposited over the entire surface of the substrate 2 and an opening 23 to be a contact hole is provided through the insulating layer 24. In general, the intermediate insulating layer 24 is often made of a metal oxide or a metal nitride. It should be noted that the intermediate insulating layer 24 is required to be deposited at a low temperature. This is because if the previously deposited insulator 8 is exposed to a high temperature during a thermal process for depositing the intermediate insulating layer 24, the characteristics of the resulting MIM element are adversely deteriorated.

After the contact hole 23 has been provided, the upper electrode 6 is formed on the insulating layer 24, thereby forming an MIM element. Next, a pixel electrode 7 is formed thereon and is connected to the upper electrode 6. As a result, an MIM element is formed of the lower electrode 5a, the insulator 8 and the upper electrode 6. The area of the element becomes equal to the area of the contact hole 23.

In this case, in order to prevent the characteristics of the MIM element from being deteriorated owing to the heat applied when the intermediate insulating layer 24 is deposited, the order in which the insulator 8 and the intermediate insulating layer 24 are formed can be inverted.

For example, the element shown in FIG. 33C can be fabricated by performing the following process steps.

First, a lower electrode 5a is formed on the surface of the element substrate 2, an intermediate insulating layer 24 is deposited over the surface of the substrate 2 and an opening 23 to be a contact hole is provided through the insulating layer 24. Next, an insulator 8 having non-linearity is deposited on the surface of the insulating layer 24 by a sputtering method or the like and then patterned into a predetermined shape. Furthermore, an upper electrode 6 and a pixel electrode 7 are formed in the same way as in the case of forming the insulator 8 before the intermediate insulating layer 24 is formed.

In the thus-obtained MIM element shown in FIG. 33C, the area of the element is also equal to the area of the contact hole 23.

However, in the case of depositing the insulator 8 by a sputtering method, pin holes are likely to be generated. In addition, since the thickness of the insulator 8 becomes less uniform, a variation is adversely caused in capacities of the elements. Thus, it is possible to make the thickness of the insulator 8 more uniform if the insulator 8 having non-linearity is deposited by methods other than the method used in the process for fabricating the MIM element shown in FIG. 33C. For example, an anodization method, a thermal oxidization method or the like may be used instead of the sputtering method. In such a case, since the insulator 8 is deposited only over a part of the surface of the lower electrode 5a corresponding to the contact hole 23, the cross section of the MIM element has a structure shown in FIG. 33D.

As described above, an MIM element using a contact hole does not use the etching edges of the lower electrode, in which an insulation breakdown is likely to be caused, as a part of the element so that it is possible to suppress the possibility of the insulation breakdown. Thus, such a structure is effectively applicable to dealing with the defects.

SUMMARY OF THE INVENTION

According to the present invention, a liquid crystal display device is provided. The liquid crystal display device includes a pair of substrates and a liquid crystal layer sandwiched between the pair of substrates, a plurality of pixel electrodes being arranged in matrix on the surface facing the liquid crystal layer of at least one of the pair of substrates, a plurality of signal lines and a plurality of two-terminal nonlinear elements being formed such that an individual one of the two-terminal nonlinear elements is connected to one of the pixel electrodes which is associated with the individual two-terminal nonlinear element and one of the signal lines which is associated with the individual two-terminal nonlinear element. In the liquid crystal display device, the two-terminal nonlinear element includes: a lower electrode connected to the associated signal line; an insulator formed so as to cover the lower electrode; and an upper electrode connected to the associated pixel electrode, and the insulator includes a first insulating film exhibiting non-linearity and a second insulating film being formed so as to cover etching edges of the lower electrode and having a slit for electrically connecting the upper electrode to the first insulating film such that a size of the two-terminal nonlinear element is determined by an opening width of the slit of the second insulating film and a line width of the upper electrode.

In one embodiment, the lower electrode of the two-terminal nonlinear element is a part of the associated signal line and the two-terminal nonlinear element is formed just above the associated signal line.

According to another aspect of the present invention, a method for fabricating a liquid crystal display device including a pair of substrates and a liquid crystal layer sandwiched between the pair of substrates is provided. In the liquid crystal display device, a plurality of pixel electrodes are arranged in matrix on the surface facing the liquid crystal layer of at least one of the pair of substrates and a plurality of signal lines and a plurality of two-terminal nonlinear elements are formed such that an individual one of the two-terminal nonlinear elements is connected to one of the pixel electrodes which is associated with the individual two-terminal nonlinear element and one of the signal lines which is associated with the individual two-terminal nonlinear element. A process for forming the individual two-terminal nonlinear element includes the steps of: forming a lower electrode connected to the associated signal line; forming a second insulating film having a slit over the lower electrode, the second insulating film being formed so as to cover both edges of the lower electrode which has been etched linearly and the slit being formed over the upper surface of the lower electrode so as to be in parallel to the linearly formed lower electrode; forming a first insulating film having non-linearity by anodizing at least the upper surface of the lower electrode; and forming an upper electrode linearly so as to cross the slit of the second insulating film at a right angle.

In one embodiment, the second insulating film is made of silicon nitride and a formation voltage for anodizing the upper surface of the lower electrode is set to be in a range from about 20 V to about 35 V, both inclusive.

In another embodiment, a relationship between a capacitance $C_{MIM}$ formed by the lower electrode, the first insulating film having non-linearity and the upper electrode and a capacitance $C_{add}$ formed by the lower electrode, the second insulating film and the upper electrode is given by: $C_{add} \leq 0.25 \times C_{MIM}$.

According to still another aspect of the present invention, a method for fabricating a liquid crystal display device including a pair of substrates and a liquid crystal layer sandwiched between the pair of substrates is provided. In the liquid crystal display device, a plurality of pixel electrodes are arranged in matrix on the surface facing the liquid crystal layer of at least one of the pair of substrates, a plurality of signal lines and a plurality of two-terminal nonlinear elements are formed such that an individual one of the two-terminal nonlinear elements is connected to one of the pixel electrodes which is associated with the individual two-terminal nonlinear element and one of the signal lines which is associated with the individual two-terminal nonlinear element. A process for forming the individual two-terminal nonlinear element includes the steps of: forming a lower electrode connected to the associated signal line; forming a first insulating film having non-linearity by an anodization method at least on an upper surface of the lower electrode; forming a second insulating film having a slit over the upper surface of the lower electrode, the second insulating film being formed at such a temperature as not to affect the non-linearity of the first insulating film and being deposited so as to cover both edges of the lower electrode which has been etched linearly and the slit being provided over the upper surface of the lower electrode so as to be in parallel to the linearly formed lower electrode; and forming an upper electrode linearly so as to cross the slit of the second insulating film at a right angle.

In one embodiment, a relationship between a capacitance $C_{MIM}$ formed by the lower electrode, the first insulating film having non-linearity and the upper electrode and a capacitance $C_{add}$ formed by the lower electrode, the first insulating film, the second insulating film and the upper electrode is given by: $C_{add} \leq 0.25 \times C_{MIM}$.

In another embodiment, the second insulating film of the two-terminal nonlinear element is a film made of either a metal nitride or a metal oxide, an organic insulating film or a multilayer film thereof.

In still another embodiment, the second insulating film is formed at a temperature equal to or lower than about 250° C.

According to still another aspect of the present invention, a switching element having a multilayer structure including: a first metal layer; a first insulating film having nonlinear resistance properties; a second insulating film having insulation properties; and a second metal layer is provided, the first metal layer and the second metal layer overlapping at a site of the switching element via the first insulating film. In the switching element, the second insulating film is formed so as to cover a pattern periphery of the first metal layer, and a distance along the pattern periphery of the first metal layer from an intersection between the pattern periphery of the first metal layer and a pattern periphery of the second insulating film to the site of the switching element is longer than a distance by which an etchant is able to penetrate from the intersection into the site of the switching element along the pattern periphery of the first metal layer when the second insulating film is etched.

In one embodiment, the distance along the pattern periphery of the first metal layer from the intersection between the pattern periphery of the first metal layer and the pattern periphery of the second insulating film to the site of the switching element is equal to or longer than about 5 μm.

In another embodiment, uneven portions are formed in the pattern periphery of the first metal layer from the intersection between the pattern periphery of the first metal layer and the pattern periphery of the second insulating film to the site of the switching element.

In still another embodiment, a taper angle at an edge of the pattern periphery of the first metal layer overlapping the second insulating film is in a range from about 20° to about 80°.

In still another embodiment, a taper angle at an edge of a pattern periphery of the first insulating film overlapping the second insulating film is in a range from about 20° to about 80°.

In still another embodiment, a film thickness of the second insulating film is in a range from about 1000 Å to about 3000 Å, including 1000 Å and 3000 Å.

Hereinafter, the functions or the effects to be attained by the present invention will be described.

In the liquid crystal display device of the present invention, by employing an element structure in which the etching edge of a lower electrode are not used as a part of the element, an MIM element can be obtained with a minimized additional capacitance which has been inevitably caused in an element structure and has adversely decreased the ratio of the capacitance of the liquid crystal layer to that of the MIM element. Thus, even when the size of the element is small, an appropriate capacitance ratio can be easily secured and an MIM element with reduced connection defects can be obtained.

Consequently, an element structure specially designed for suppressing point defects becomes applicable to even a large-capacity liquid crystal display device having a reduced pixel pitch. As a result, a liquid crystal display device with minimized point defects can be provided.

Thus, the invention described herein makes possible the advantage of providing: a switching element which can suppress the generation of point defects, minimize the additional capacitance and prevent the erosion by an etchant during the fabrication process thereof; a liquid crystal display device including such a switching element; and the method for fabricating such a liquid crystal display device.

This and other advantages of the present invention will become apparent to those skilled in the art upon reading and

BRIEF DESCRIPTION OF THE DRAWINGS

FIGS. 9A through 9E are cross-sectional views illustrating the process steps for fabricating the element substrate shown in FIGS. 8A and 8B.

FIG. 33A is a plan view of a conventional element substrate including an MIM element provided with a contact hole, while FIGS. 33B through 33D are cross-sectional views of the element substrates having various structures taken along the line 33B-D—33B-D shown in FIG. 33A.

DESCRIPTION OF THE PREFERRED EMBODIMENTS

Before the preferred embodiments of the present invention are described, problems associated with the presence of an additional capacitance and the decrease in capacitance ratio which have been adversely caused in conventional switching elements will be described.

As described above, since a liquid crystal display device applicable to portable information units is required to perform large-capacity display within a small-sized screen, the pixel pitch thereof is naturally required to be reduced. Thus, the capacity per pixel is also reduced.

Since it is necessary to secure a capacitance ratio $C_{LC}/C_{MIM}$ of about 10 as also mentioned above, it is naturally necessary to reduce the size (or the capacity) of an individual MIM element. In some cases, a size substantially equal to a limit size for exposure or a size on the order of several µm is required.

Hereinafter, a case where such a minimal size is required for an MIM element including a contact hole will be described.

Conventionally, in designing a contact hole, an exposure mask is fabricated such that the line widths of a lower electrode and an upper electrode become larger than the size of a contact hole (or the size of an element), in view of the case where the patterns of the lower electrode, the contact hole and the upper electrode are misaligned or the line widths of these electrodes are reduced by an excessive etching.

As described above, since the capacitance ratio $C_{LC}/C_{MIM}$ is important, it is necessary to prevent the size (or the capacity) of an element from being increased. However, in an MIM element having a conventional structure, an additional capacitance is further generated in the hatched portion E shown in FIG. 33A in addition to the capacitance of the element formed by the lower electrode 5a, the insulator 8 and the upper electrode 6. In the case of providing a contact hole, this additional capacitance is inevitably generated and cannot be totally eliminated.

In the cases where the element has such cross sections as those shown in FIGS. 33B and 33C, this additional capacitor is formed by the lower electrode 5a, the insulator 8, the intermediate insulating layer 24 and the upper electrode 6. On the other hand, in the case where the element has such a cross section as that shown in FIGS. 33D, this capacitor is formed by the lower electrode 5a, the intermediate insulating layer 24 and the upper electrode 6.

Figure 31A:
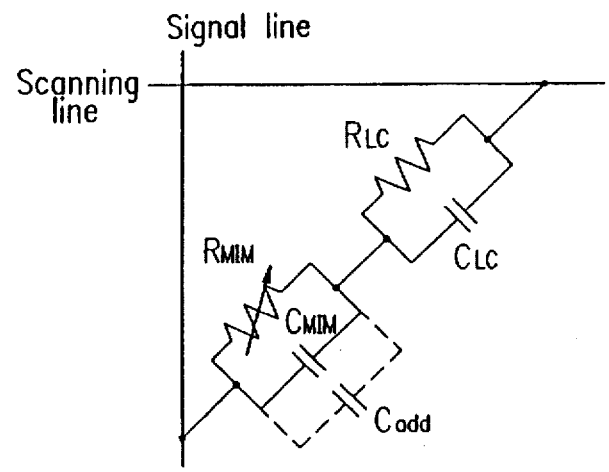
FIG. 31A is an equivalent circuit diagram of one pixel of a liquid crystal display device including an MIM element.
Figure 31B:
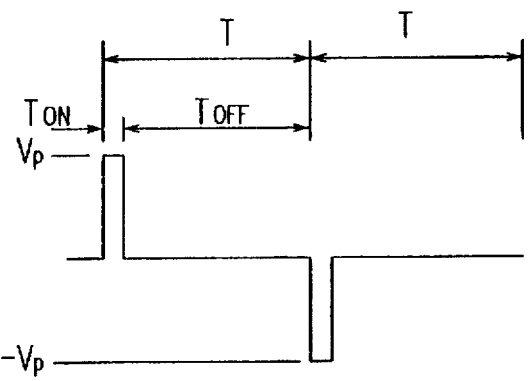
FIGS. 31B and 31C illustrate the exemplary waveforms of the voltages applied to the element terminals and the counter terminals, respectively.
Figure 31C:
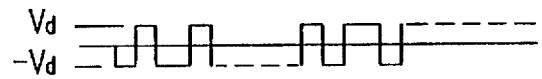
Figure 31D:
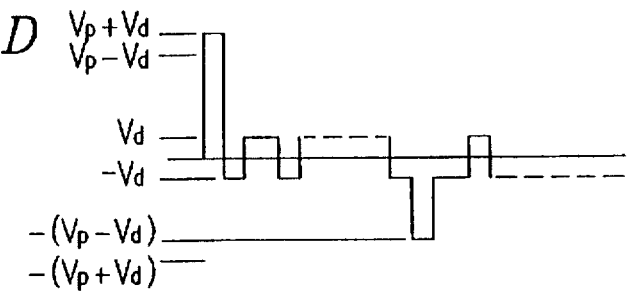
FIG. 31D illustrates an exemplary driving waveform obtained by combining the waveforms shown in FIGS. 31B and 31C.
Figure 31E:
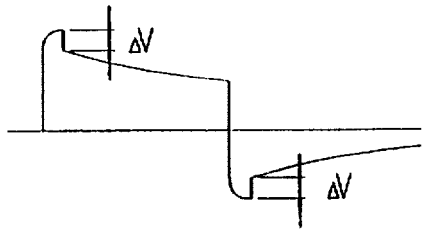
FIG. 31E illustrates a variation in voltages applied to the liquid crystal layer in accordance with the driving waveform shown in FIG. 31D along the passage of time.
Figure 32:
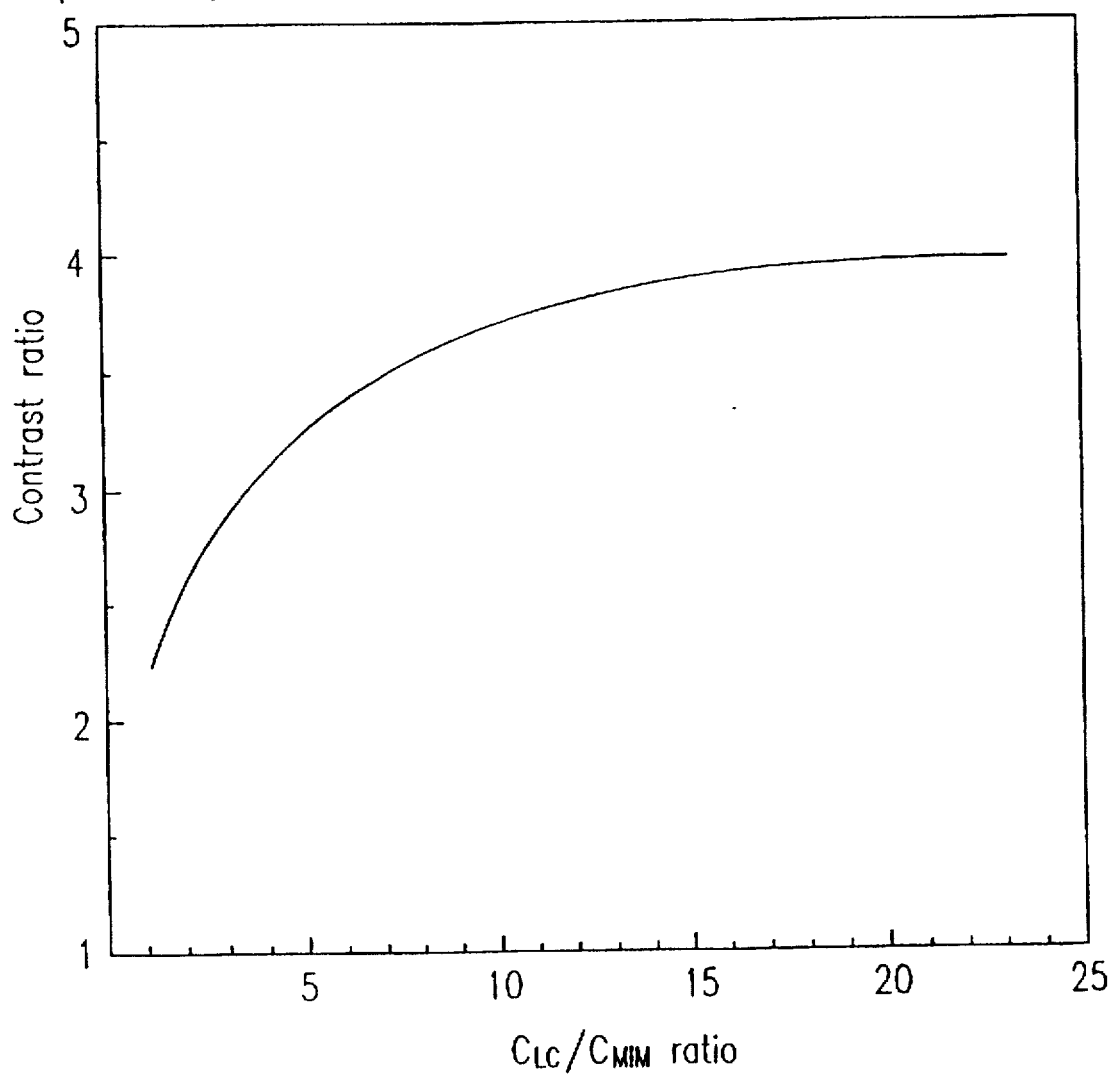
FIG. 32 is a graph representing a relationship between a ratio of the capacitance $C_{LC}$ of the liquid crystal layer to the capacitance $C_{MIM}$ of the MIM element and the contrast ratio of the liquid crystal display device.

Though this capacitor does not function as a diode, the capacitor is a capacitor $C_{add}$ connected in parallel to the natural element capacitor $C_{MIM}$. As a result, the entire capacitance of the element is adversely increased as indicated by the broken lines in the equivalent circuit diagram shown in FIG. 31A. Thus, the capacitance ratio $C_{LC}/C_{MIM}$ is disadvantageously decreased.

Hereinafter, a specific example of the decrease in capacitance ratio $C_{LC}/C_{MIM}$ will be described by means of calculations. The following exemplary numerical values are used.
Element structure: FIG. 33D
Finish line width of lower electrode 5a: about 10 μm
Finish line width of upper electrode 6: about 10 μm
Finish area of through hole 23 (element): about 4 μm×4 μm
Film thickness ($d_{Ta2O5}$) and dielectric constant ($\epsilon_{Ta2O5}$) of insulator 8 ($Ta_2O_5$): about 60 nm, about 20
Film thickness ($d_{Si3N4}$) and dielectric constant ($\epsilon_{Si3N4}$) of intermediate insulating layer 24 ($Si_3N_4$): about 300 nm, about 8

When these numerical values are used, the original area $S_{MIM}$ of the MIM element becomes 16 μm² and the area $S_{add}$ (hatched portion E shown in FIG. 33A) of the additional capacitor is: 10×10−16=84 μm².

Since the capacitance C is proportional to a quotient obtained by dividing the product of the area S and the dielectric constant ε by the film thickness d, the relationship between $C_{add}$ and $C_{MIM}$ can be derived by the following equation:

$$C_{add} = C_{MIM} \times (\epsilon_{Si3N4} \cdot S_{add} / d_{Si3N4})/(\epsilon_{Ta2O5} \cdot S_{MIM} / d_{Ta2O5})$$

$$\approx C_{MIM} \times 0.42$$

That is to say, the additional capacitance $C_{add}$ becomes about 42% of the natural capacitance $C_{MIM}$ of the element. Thus, it is seen that the initial value of the capacitance ratio $C_{LC}/C_{MIM}$ (=10) is decreased substantially to about 7.04 (≈10/(1+0.42)). In the case where the pixel pitch is small and the capacitance ratio $C_{LC}/C_{MIN}$ is smaller than 10, the presence of such an additional capacitance becomes more and more critical.

As a result, even when a selection waveform is applied to an arbitrary element (or pixel), the element cannot be sufficiently turned ON and the contrast ratio is disadvantageously decreased.

Furthermore, since the size of a contact hole is small, the patterns cannot be satisfactorily shaped in some cases. As a result, connection defects are caused and it sometimes becomes difficult to form an element itself.

In view of these circumstances, the present invention provides an MIM element which can minimize such an additional capacitance which has been inevitably caused in an MIM element using an intermediate insulating layer and can be easily patterned, and a liquid crystal display device with point defects minimized.

Hereinafter, the embodiments of the liquid crystal display device having a switching element according to the present invention will be described in the following first to third examples.

EXAMPLE 1

Figure 1:
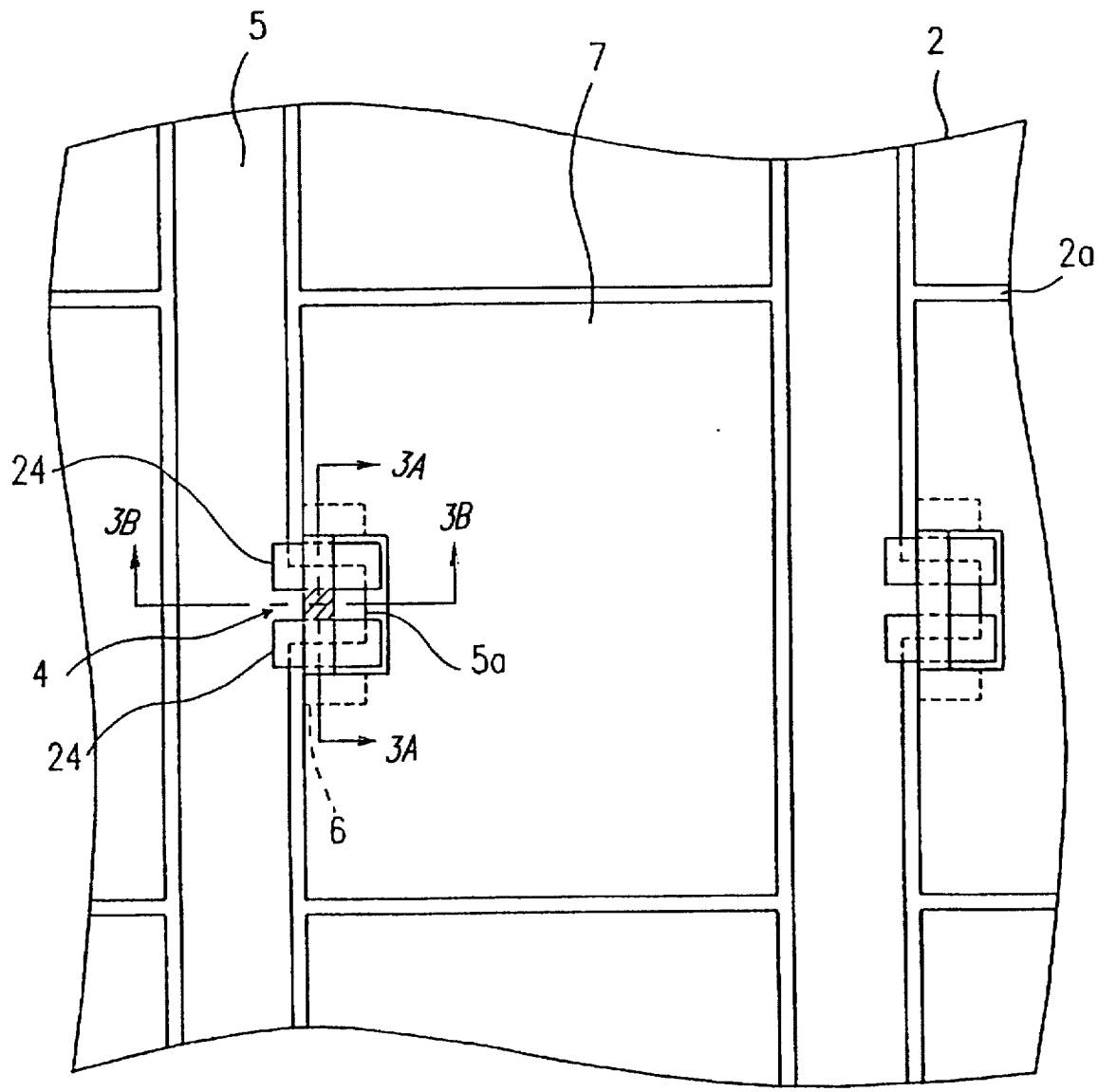
FIG. 1 is a plan view of an element substrate of the liquid crystal display device in the first example of the present invention.
Figure 23:
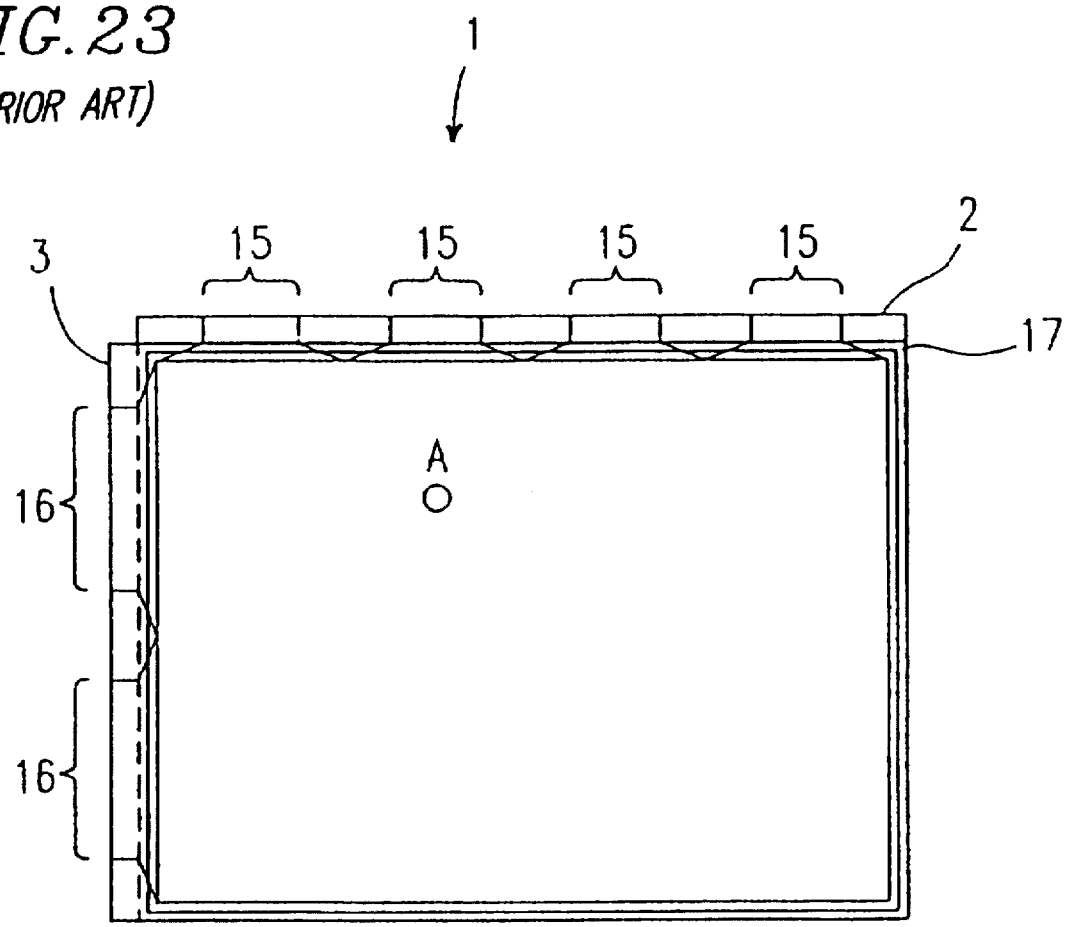
FIG. 23 is a plan view of a conventional liquid crystal display device.
Figure 25:
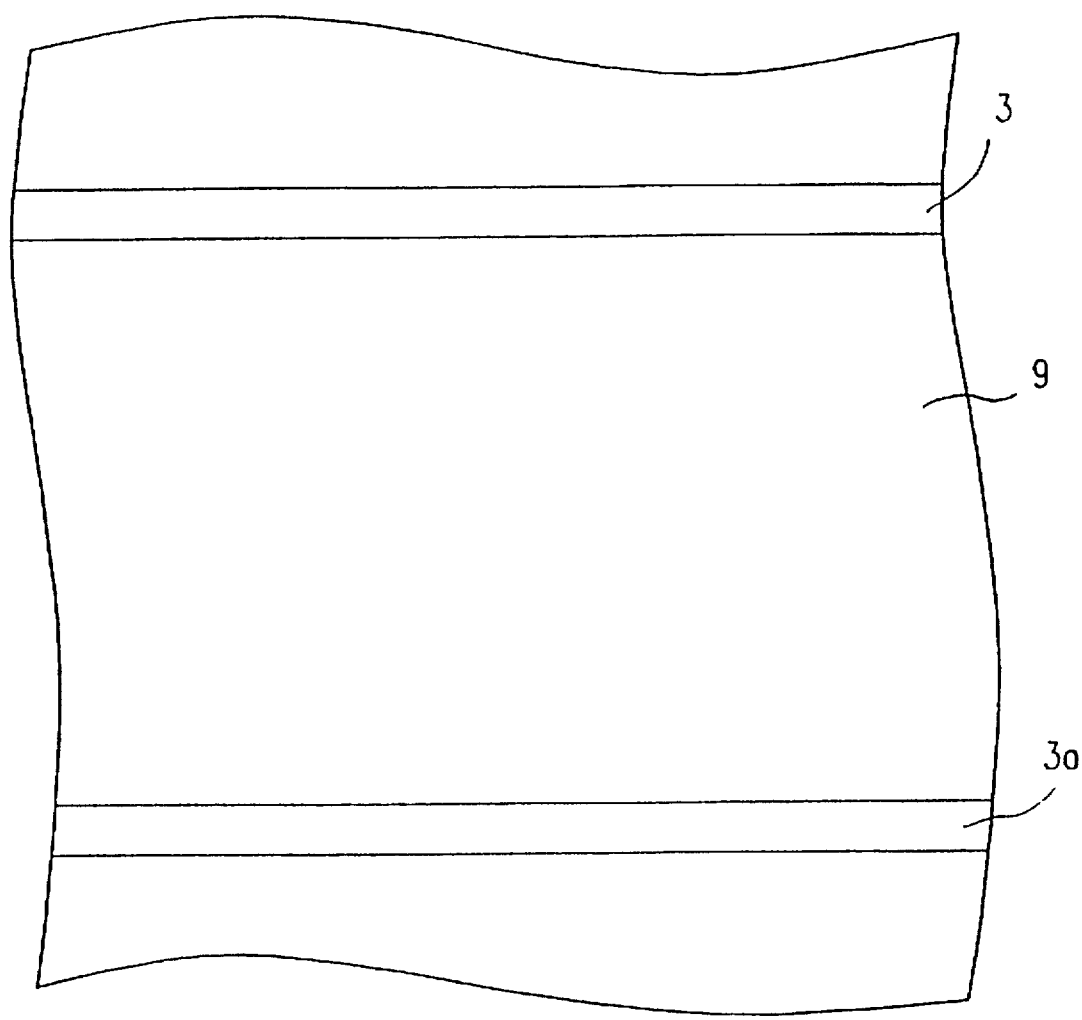
FIG. 25 is a plan view of the counter substrate to be opposed to the element substrate shown in FIG. 24.
Figure 26:
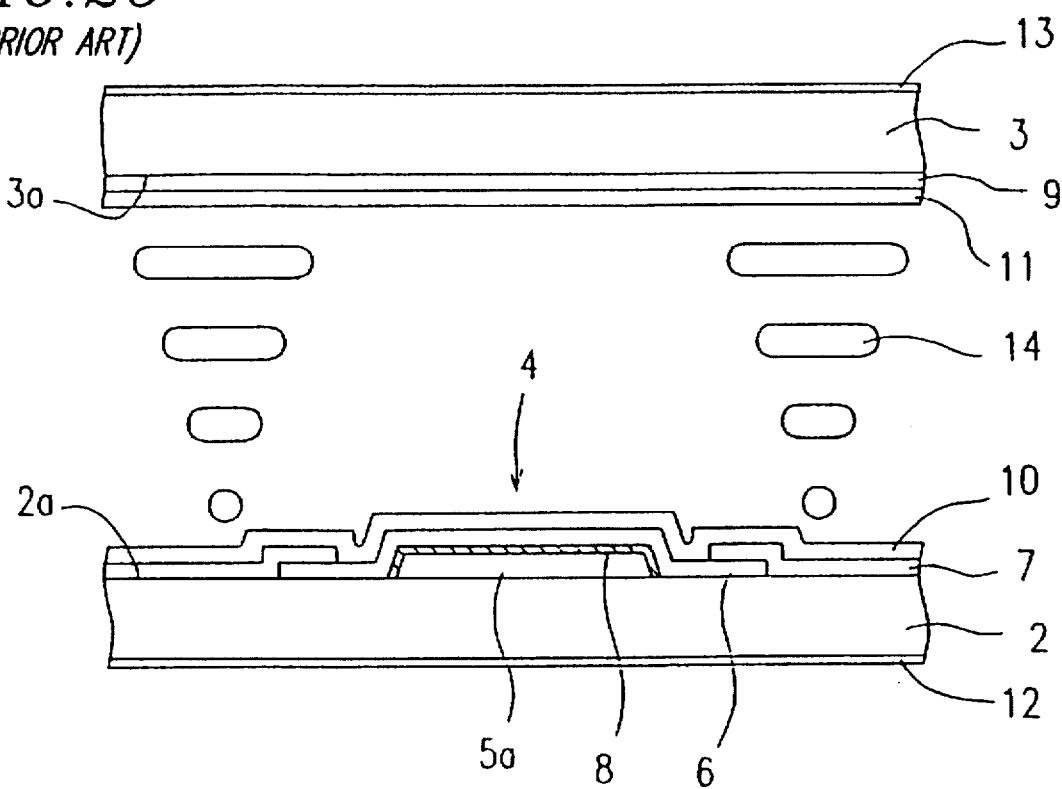
FIG. 26 is a cross-sectional view of the conventional liquid crystal display device including an MIM element taken along the line 26—26 shown in FIG. 24.
Figure 27A:
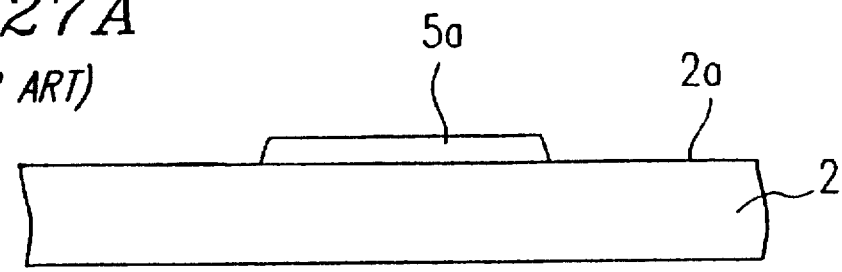
FIGS. 27A through 27D are cross-sectional views illustrating the process steps for fabricating the element substrate shown in FIG. 24.
Figure 27B:
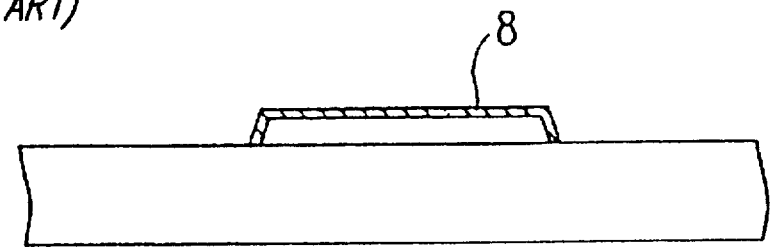
Figure 27C:
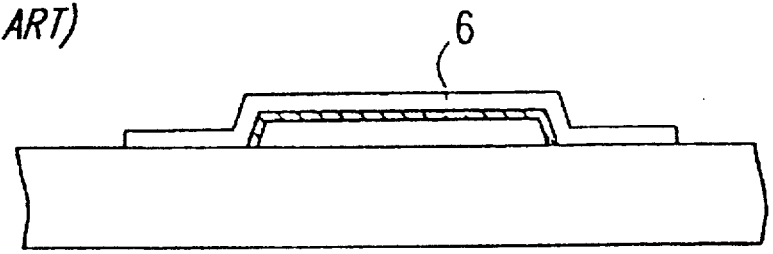
Figure 27D:
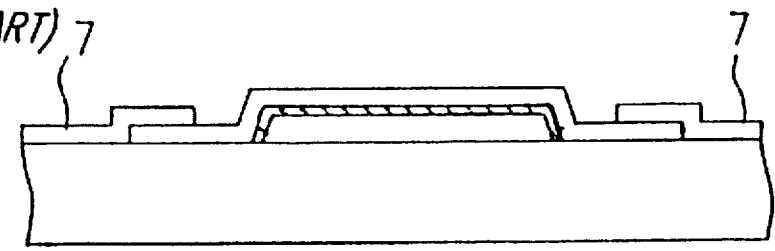
Figure 28:
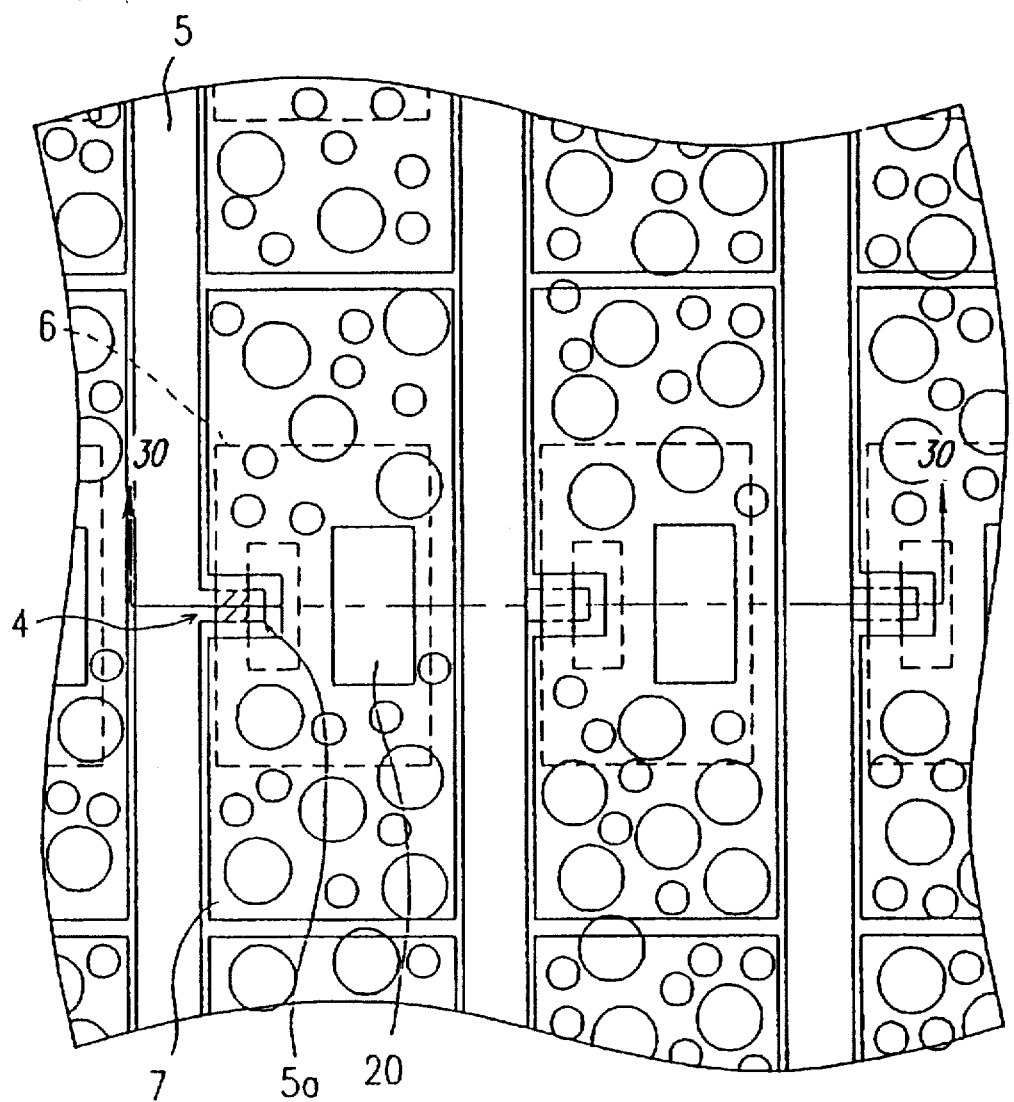
FIG. 28 is a plan view showing the element substrate of a reflective color liquid crystal display device using an MIM element as a switching element.
Figure 29:
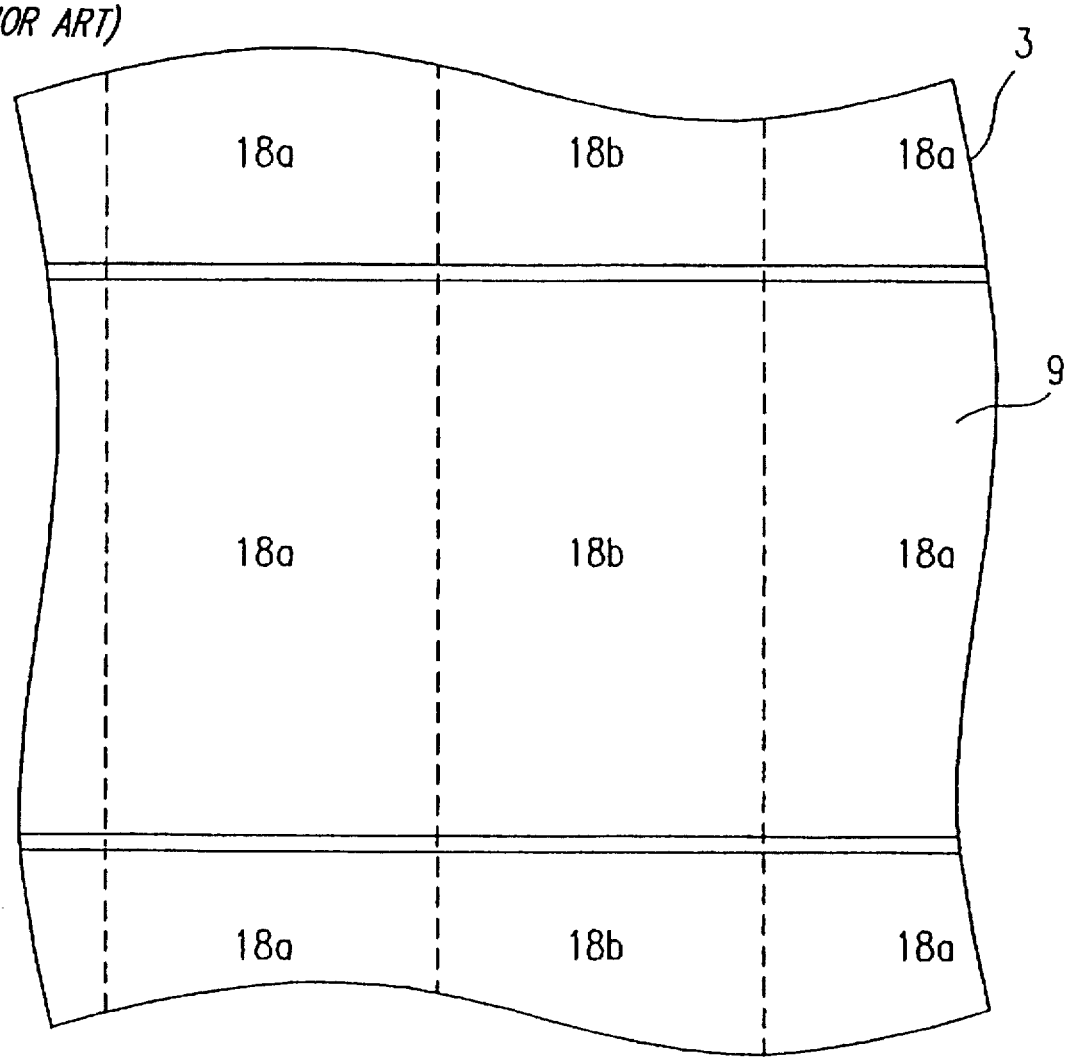
FIG. 29 is a plan view of the counter substrate of the reflective color liquid crystal display device shown in FIG. 28.
Figure 30:
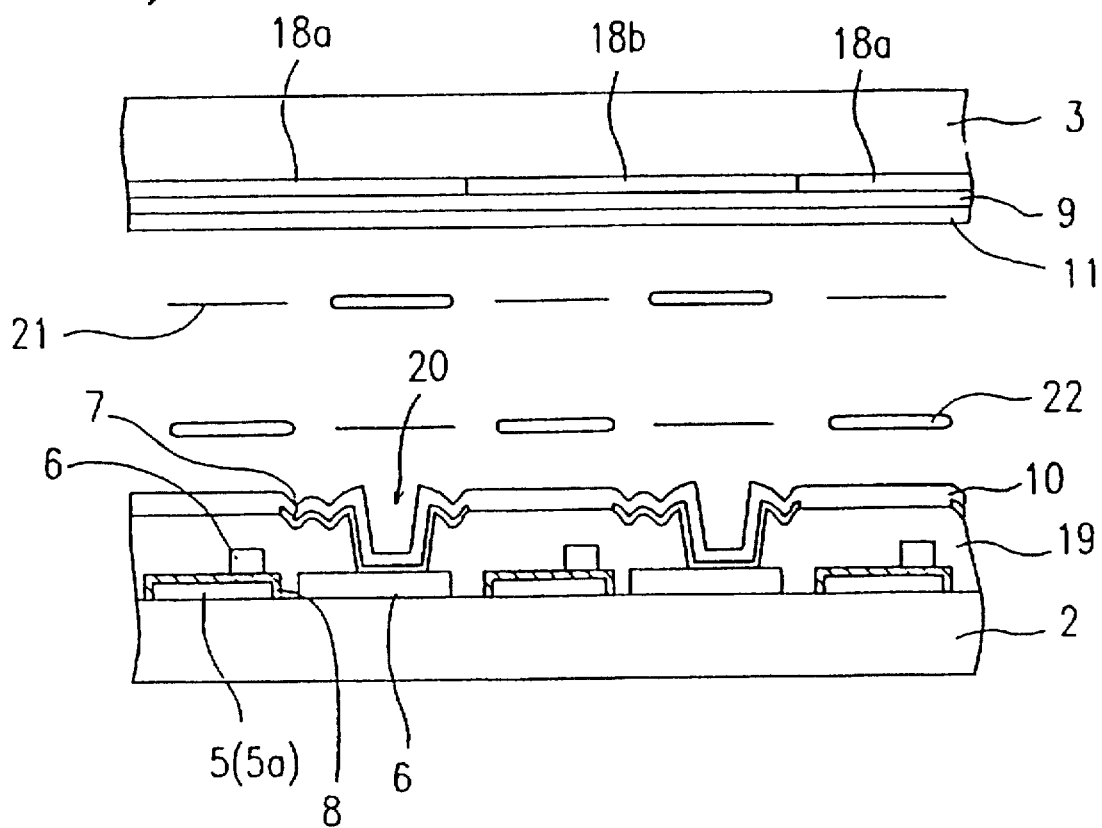
FIG. 30 is a cross-sectional view of the reflective color liquid crystal display device taken along the line 30—30 shown in FIG. 28.

FIG. 1 is a plan view of an element substrate 2 of the liquid crystal display device in the first example of the present invention. A portion surrounding one pixel region is illustrated in FIG. 1. The liquid crystal display device of the present invention includes an element substrate 2 having the configuration shown in FIG. 1 and a counter substrate 3 having the configuration shown in FIG. 25. Since the planar configuration of the liquid crystal display device after these substrates 2 and 3 are attached to each other is the same as that shown in FIG. 23, the description thereof will be omitted herein.

Figure 2:
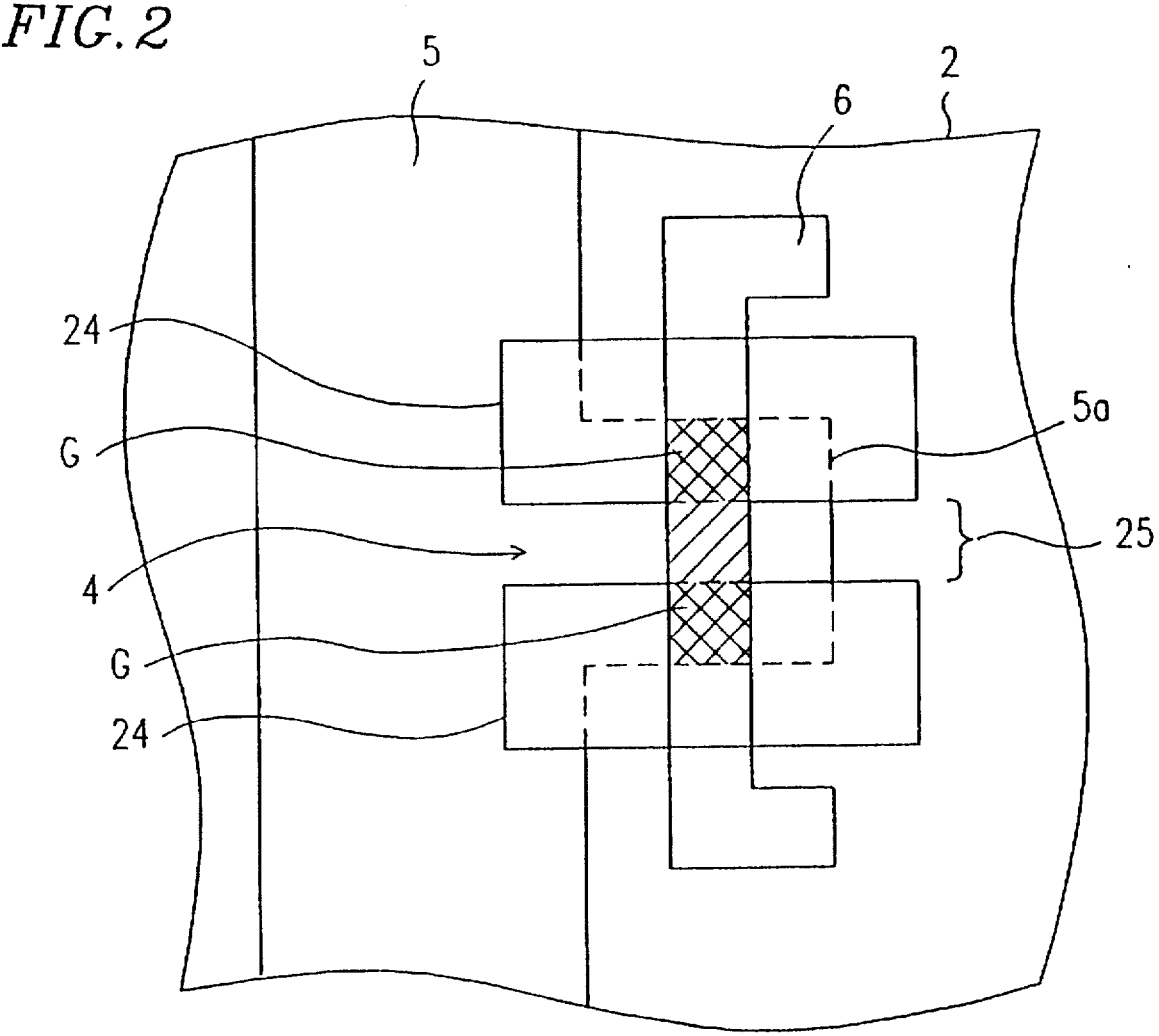
FIG. 2 is a plan view showing a portion of the element substrate shown in FIG. 1 in the vicinity of an MIM element.
Figure 3A:
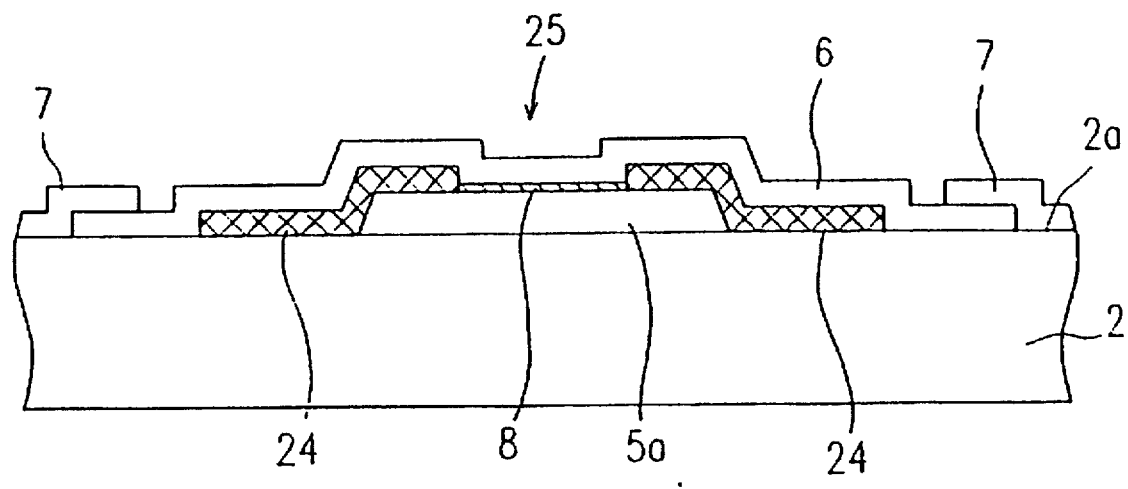
FIG. 3A is a cross-sectional view of the element substrate of the liquid crystal display device of the first example taken along the line 3A—3A shown in FIG. 1.
Figure 3B:
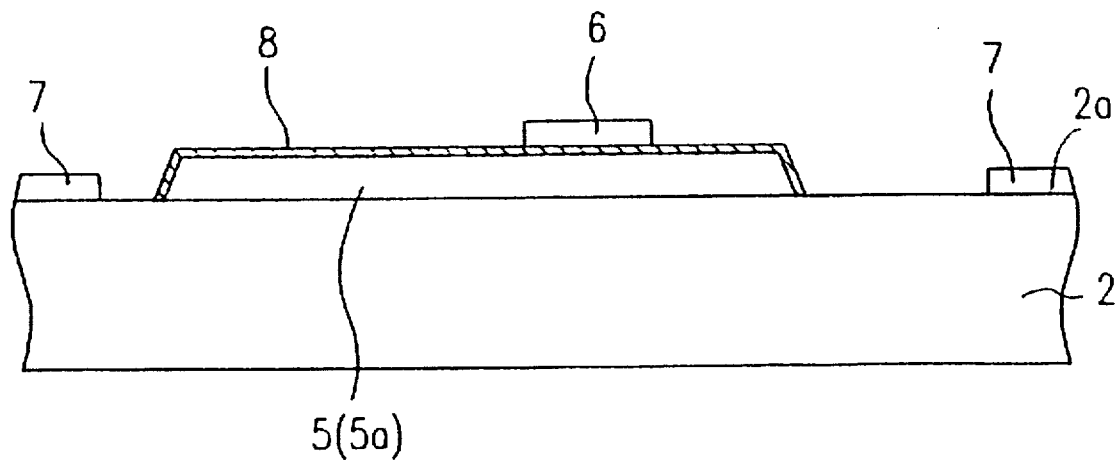
FIG. 3B is a cross-sectional view of the element substrate taken along the line 3B—3B shown in FIG. 1.

FIG. 2 is a plan view showing a portion of the element substrate shown in FIG. 1 in the vicinity of an MIM element 4. For visual simplicity, it is noted that the pixel electrode 7 is not shown in FIG. 2. FIG. 3A is a cross-sectional view of the element substrate taken along the line 3A—3A shown in FIG. 1, while FIG. 3B is a cross-sectional view of the element substrate taken along the line 3B—3B shown in FIG. 1.

In this first example, a plurality of pixel electrodes 7 arranged in matrix, a plurality of MIM elements provided so as to correspond to the respective pixel electrodes 7 and a plurality of signal lines 5 disposed in parallel with each other are formed on the surface of the element substrate 2. Each of the signal lines 5 is electrically connected to an associated column of pixel electrodes 7 via the MIM elements 4. The MIM element 4 is a two-terminal nonlinear element including: a lower electrode 5a; a first insulating film 8 having non-linearity; and an upper electrode 6. A second insulating film 24 is further provided over the etching edges of the lower electrode 5a. In this MIM element 4, the etching edges of the lower electrode 5a are not used as a part of the element. The lower electrode 5a shown in FIG. 1 include three sides: namely, a side parallel to the signal line 5 and two sides vertical to the signal line 5. Herein, the side parallel to the signal line 5 will be simply referred to as a "top edge" and the other sides will be referred to as "etching edges".

The second insulating film 24 is formed in a stripe shape so as to be parallel to the protruding direction of the lower electrode 5a from the signal line 5 (i.e., the direction along the line 3B—3B shown in FIG. 1) and to cover the etching edges of the lower electrode 5a. As a result, as shown in FIG. 2, a slit 25 is formed over the region between both the etching edges of the lower electrode 5a.

The upper electrode 6 is formed linearly in a direction vertical to the stripe-shaped second insulating film 24 (i.e., the direction along the line 3A—3A shown in FIG. 1).

Consequently, in this example, the cross-hatched portion shown in FIG. 1 functions as the MIM element 4. The area of the element region is determined by the distance between the stripes of the second insulating film 24 (i.e., the width of the slit 25) and the line width of the upper electrode 6.

Next, the process steps for fabricating the element substrate 2 in the first example of the present invention will be described with reference to FIGS. 4A to 4E. FIGS. 4A through 4E are cross-sectional views taken along the line 3A—3A shown in FIG. 1.

Figure 4A:
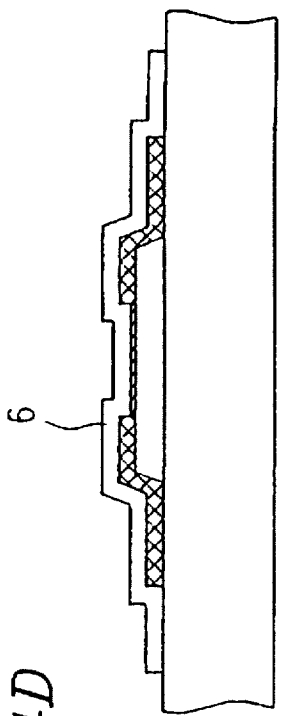
FIGS. 4A through 4E are cross-sectional views illustrating the process steps for fabricating the element substrate shown in FIG. 1.

First, a metal thin film (e.g., a Ta thin film) to be the signal line 5 and the lower electrode 5a is formed on the surface 2a of a glass substrate 2 (the element substrate) and then patterned into a predetermined shape (FIG. 4A). In this example, a fusion pyrex glass substrate (Corning #7059) was used as the glass substrate 2. It is noted that a base coating film made of an insulating material such as tantalum pentoxide may be formed on the surface 2a of the glass substrate 2 before the Ta thin film is formed, though such a film is not shown in FIG. 4A. Naturally, such a base coating film may be omitted. However, since such a film contributes to the prevention of the contamination by the impurities diffused from the substrate, the film is preferably formed for attaining satisfactory element characteristics.

The Ta thin film was deposited to be about 300 nm thick by a DC sputtering method using a sintered target of Ta containing about 2 to about 10 mol % of nitrogen and then patterned into a predetermined shape by a dry etching method using $CF_4$ and $O_2$.

It is noted that, according to the present invention, the capacitance $C_{MIM}$ of the MIM element 4 does not depend upon the line width of the lower electrode 5a but upon the width of the slit 25 of the second insulating film 24 and the line width of the upper electrode 6, as described above. Thus, it is not always necessary to use a dry etching method having high etching precision as just mentioned above. Alternatively, the Ta thin film may be patterned by a wet etching method using nitrate fluoride or the like. Since the process speed is accelerated in such a case, the latter method is preferable in view of the throughput.

Figure 4D:
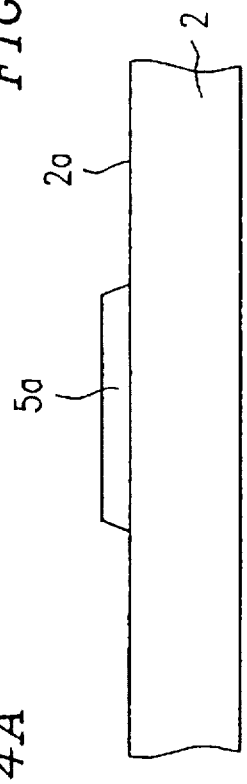
Figure 4B:
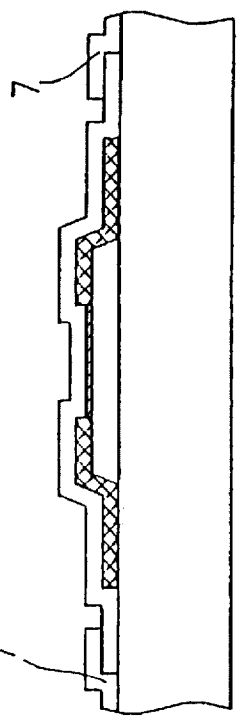
Figure 4E:
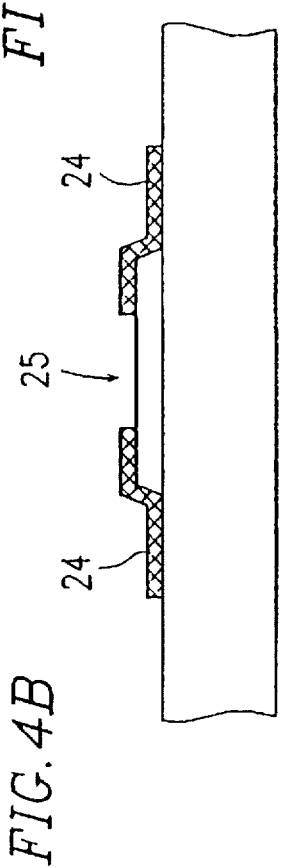

Next, a second insulating film 24 to be the intermediate insulating layer is deposited over the surface 2a of the substrate 2 and then patterned into a stripe shape along the protruding direction of the lower electrode 5a such that the intermediate insulating layer 24 is left so as to cover the region surrounding the etching edges of the lower electrode 5a, thereby providing the slit 25 (FIG. 4B). In this example, a silicon nitride film was formed as the second insulating film 24 to be about 300 nm thick at 350° C. by a P-CVD method and then patterned into a predetermined shape by a wet etching method using buffered hydrofluoric acid. Alternatively, the second insulating film 24 may be patterned by a dry etching method, instead of the wet etching method.

Figure 4C:
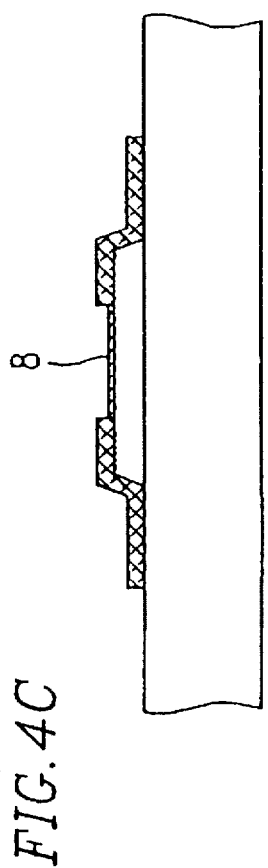

Subsequently, a first insulating film 8 is formed on the portion of the lower electrode 5a which is not covered with the second insulating film 24 by an anodization method (FIG. 4C). In this example, the anodization was performed at about 25° C. by using a 1% ammonium tartrate solution as an electrolytic solution and supplying a formation current of about 0.18 mA/cm² to the area to be anodized.

Hereinafter, the relationship between the formation voltage supplied for forming an anodized film used as an insulating film (i.e., the first insulating film 8) for the MIM element and the defects caused in the MIM element will be described.

In general, the film thickness of an anodized film to be used for an MIM element is about 40 to about 70 nm. This thickness corresponds to the thickness of a film resulting from the anodization performed by supplying formation voltage of about 20 to about 37 V under the above-described anodization conditions. In this example, the anodization was performed at a formation voltage of about 31 V so as to obtain an anodized film having a thickness of about 60 nm.

In this case, the thickness of the anodized film (or the first insulating film 8) is in proportion to the formation voltage. In general, the thicker the first insulating film 8 becomes, the higher the electric breakdown voltage of the film becomes. Consequently, such a thick film becomes less likely to be subjected to the insulation breakdown caused by static electricity. Thus, in order to suppress the generation of defects in an MIM element, it is preferable to increase the thickness of the first insulating film 8. On the other hand, the abruptness of the current-voltage characteristics of an element in the vicinity of the threshold value thereof is generally inversely proportional to the thickness value of the first insulating film 8. Thus, if the thickness of the first insulating film 8 is increased, then the abruptness of the current-voltage characteristics is decreased. In view of this respect, it is not preferable to increase the thickness of the first insulating film 8.

However, the present inventors found that, by configuring an MIM element under the structure of the present invention, the generation of defects in the MIM element could be suppressed even when the formation voltage used for forming an insulating film by an anodization method was low.

Figure 24:
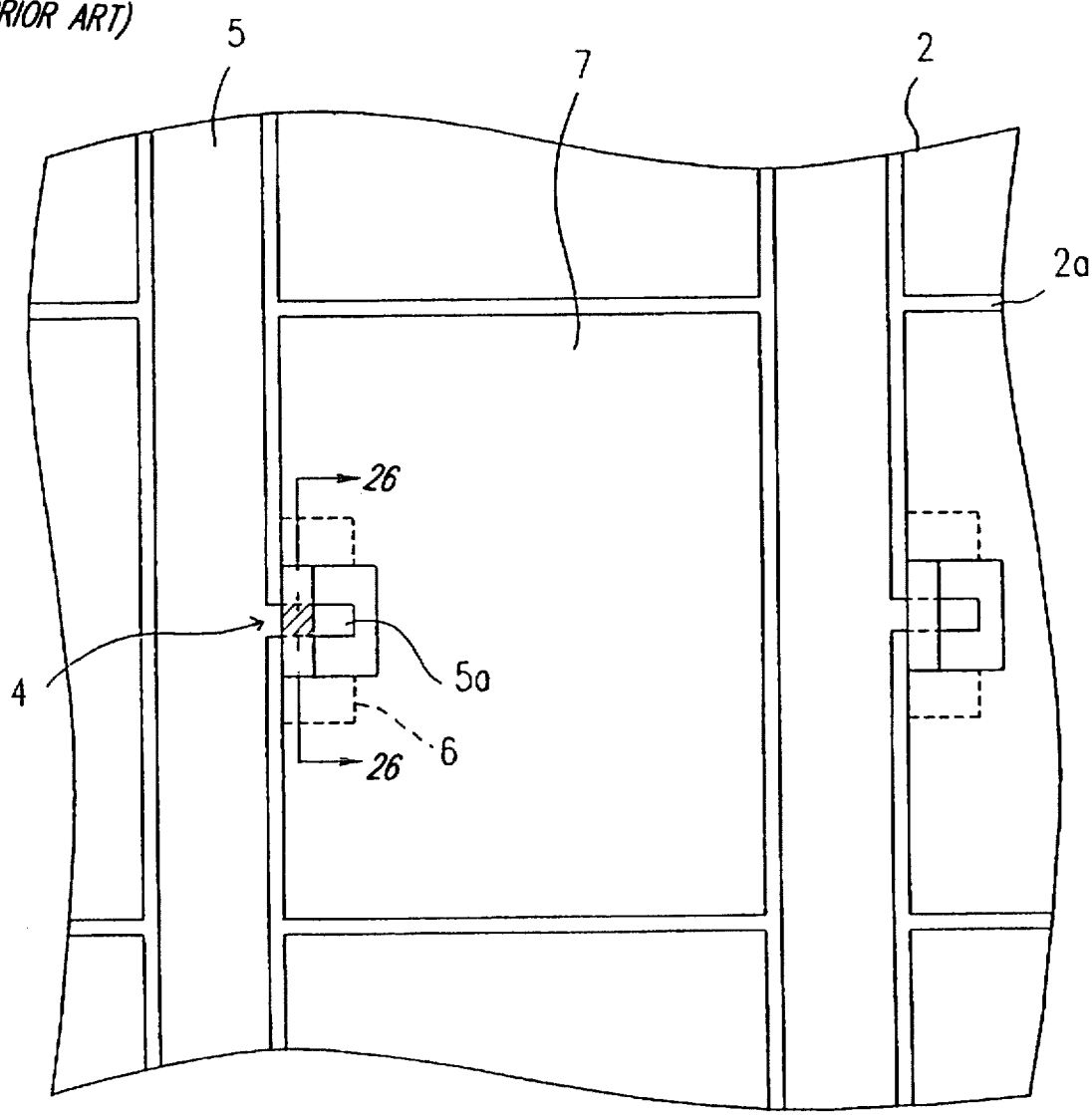
FIG. 24 is a plan view of the element substrate including an MIM element of the conventional liquid crystal display device.

The following Table 1 shows the distribution of the numbers of generated point defects in accordance with the variation in formation voltages based on the experimental results obtained by the present inventors. In this case, liquid crystal panels having 480×CR×320 pixels (elements) shown in FIGS. 29, 30 and 31A–31E were used as the objects of the experiment. The number of the short-circuit defects per panel was counted. As a comparative example, liquid crystal panels including MIM elements having the conventional structure shown in FIG. 24 were also modeled. The distribution of the numbers of defects generated in such panels in the case where the anodization for forming the insulating film was performed at 35 V is also shown on the bottom row in Table 1.

TABLE 1

| formation voltage | Number of defects generated per panel | | | | |
|---|---|---|---|---|---|
| | 0 | 1–5 | 6–10 | 21–50 | 101– |
| 31 V | 85.3% | 14.7% | | | |
| 35 V | 52.8% | 44.4% | 2.8% | | |
| 39 V | 27.3% | 57.6% | 6.1% | | 9.1% |
| Prior Art | 27.3% | 27.3% | 22.7% | 13.6% | 9.1% |

As shown in Table 1, in the case of employing the conventional MIM element structure, the panels in which the number of defects generated per panel was equal to or smaller than 5 occupied about 54% of all the panels. In contrast to the conventional ones, under the MIM element structure of the present invention, satisfactory results were attained, that is to say, the panels where the number of point defects per panel was 5 or less occupied over 90% of all the panels.

As is clear from the results shown in Table 1, in the MIM element structure of the present invention, the lower the formation voltage, the smaller the number of generated defects became. Thus, the anodization should be performed by setting the formation voltage preferably at about 35 V or lower, more preferably at about 31 V.

The thickness of the first insulating film 8 resulting from the anodization in which a formation voltage of about 35 V or lower was applied was about 65 nm or less under the above-described anodization condition. When the thickness of the insulating film 8 is in the vicinity of this value, the abruptness of the current-voltage characteristics of the MIM element in the vicinity of the threshold value thereof is not deteriorated. Consequently, the MIM element of the present invention can deal with the insulation breakdown of the element without deteriorating the characteristics of the element.

After the first insulating film 8 is formed by anodizing the surface of the lower electrode 5a in such a manner, a thin film made of Ti or the like is formed over the surface 2a of the substrate 2 and then patterned, thereby obtaining the upper electrode 6 (FIG. 4D). In this way, an MIM element 4 including the lower electrode 5a, the first insulating film 8 and the upper electrode 6 can be obtained as a two-terminal nonlinear element.

In this MIM element 4, the upper electrode 6 and the lower electrode 5a are connected to the first insulating film 8 via the slit 25. As a result, the area in which the additional capacitance $C_{add}$ has been inevitably generated in the conventional MIM structure can be geometrically minimized as indicated by the portions G shown in FIG. 2.

Hereinafter, specific values of the element capacitance $C_{MIM}$ and the additional capacitance $C_{add}$ to be generated in the MIM element of the present invention will be calculated. In order to compare the MIM element of the present invention with a conventional MIM element structure having a contact hole, the element capacitance (the area $S_{MIM}$ is 4 μm×4 μm) is assumed to be equal and the following numerical values and the above-described constants are used.

Element structure: FIG. 3A

Finish line width of lower electrode 5a: about 10 μm
Finish line width of upper electrode 6: about 4 μm
Finish width of slit 25: about 4 μm
Film thickness ($d_{Ta2O5}$) and dielectric constant ($\epsilon_{Ta2O5}$) of first insulating film 8 ($Ta_2O_5$): about 60 nm, about 20
Film thickness ($d_{Si3N4}$) and dielectric constant ($\epsilon_{Si3N4}$) of second insulating film ($Si_3N_4$): about 300 nm, about 8

When these numerical values are used, the original area $S_{MIM}$ of the MIM element becomes about 16 μm$^2$ and the area of the additional capacitor $S_{add}$ (hatched portions G) becomes about 24 μm$^2$ (=4×3+4×3). Thus, the additional capacitance $C_{add}$ is given by:

$$C_{add} = C_{MIM} \times (\epsilon_{Si3N4} \cdot S_{add} / d_{Si3N4}) / (\epsilon_{Ta2O5} \cdot S_{MIM} / d_{Ta2O5})$$

$$\approx C_{MIM} \times 0.120$$

That is to say, the additional capacitance $C_{add}$ becomes about 12% of the natural capacitance $C_{MIN}$ of the element. Thus, it is seen that the initial value of the capacitance ratio $C_{LC}/C_{MIM}$ (=10) becomes substantially equal to about 8.9 (≈10/(1+0.12)). As a result, the decrease in contrast ratio of the liquid crystal display device can be minimized.

Since the permissible minimum capacitance ratio $C_{LC}/C_{MIM}$ is about 8 as described above, the permissible maximum ratio of $C_{add}$ to $C_{MIM}$ is about 0.25 (because 10/(1+0.25)=8).

Consequently, in this case, so long as a relation $C_{add} \leq C_{MIM} \times 0.25$ is satisfied, the overlap margin between the lower electrode and the intermediate insulating layer and the line width of the upper electrode can be increased. As a result, the MIM element can be fabricated with more flexibility.

Figures 5A, 5B:
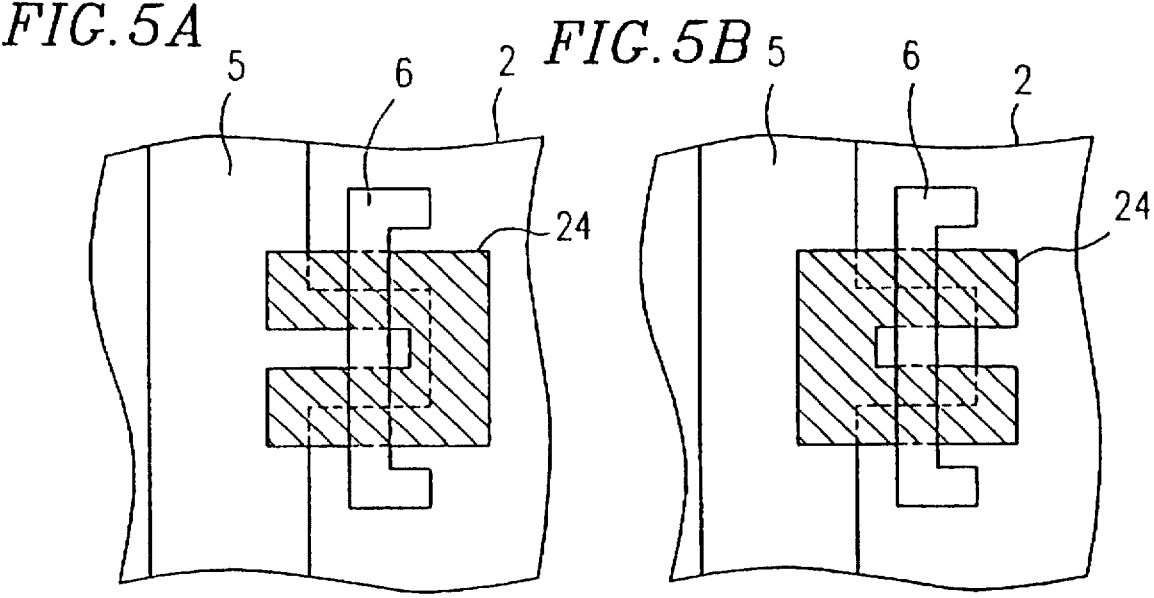
FIGS. 5A through 5C are plan views showing the variants of the liquid crystal display device of the present invention.

In addition, since the second insulating film 24 is formed in a stripe shape and a slit 25 is provided therein for connecting the lower electrode 5a to the upper electrode 6, the second insulating film 24 can be patterned easily and connection defects can be eliminated from the element structure. In this example, the second insulating film 24 is assumed to be shaped so as to include two stripes. Alternatively, the slit may be formed in any of the shapes shown in FIGS. 5A to 5C. For example, when the second insulating film 24 is made of silicon nitride, the adhesiveness of such a film to a photoresist member used during a photolithography process is poor so that such a photoresist is likely to be misaligned or peeled off during a patterning process. Thus, such a film is likely to cause a variation in sizes of the resulting elements. Accordingly, in order to prevent such a pattern misalignment and strengthen the insulating film 24, the second insulating film 24 may be formed in a U shape by combining the two stripes on the right or on the left as shown in FIGS. 5A and 5B.

Figure 5C:
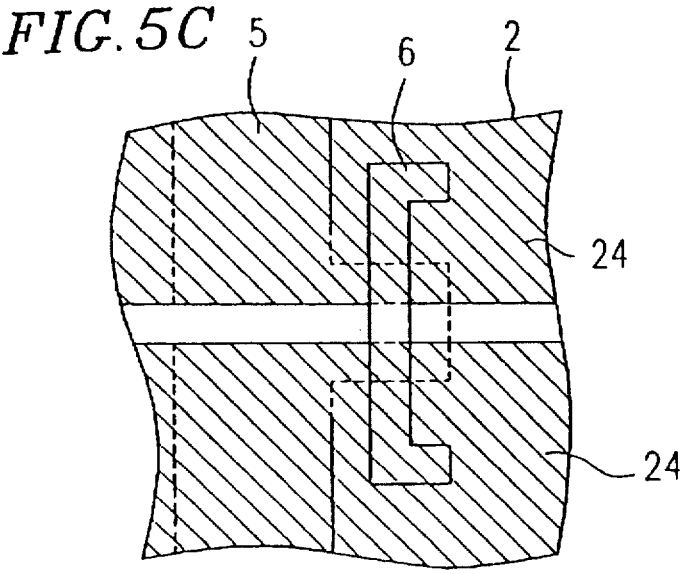

On the other hand, the upper electrode 6 is possibly disconnected in the stepped portions of the second insulating film 24 at the etching edges. Thus, the second insulating film 24 may be formed so as to have an area at least larger than that of the pattern of the upper electrode 6. For example, as shown in FIG. 5C, the insulating film 24 may be formed over the entire area of a pixel and only a slit may be formed over the lower electrode.

Moreover, the effects obtained by providing such a contact slit will be described with reference to FIGS. 6 and 7A–7C.

In general, a stepper exposure apparatus securing an exposure precision is frequently used for fabricating various active elements such as thin film transistors (TFTs), MIM elements or the like for a liquid crystal display device.

Figure 6:
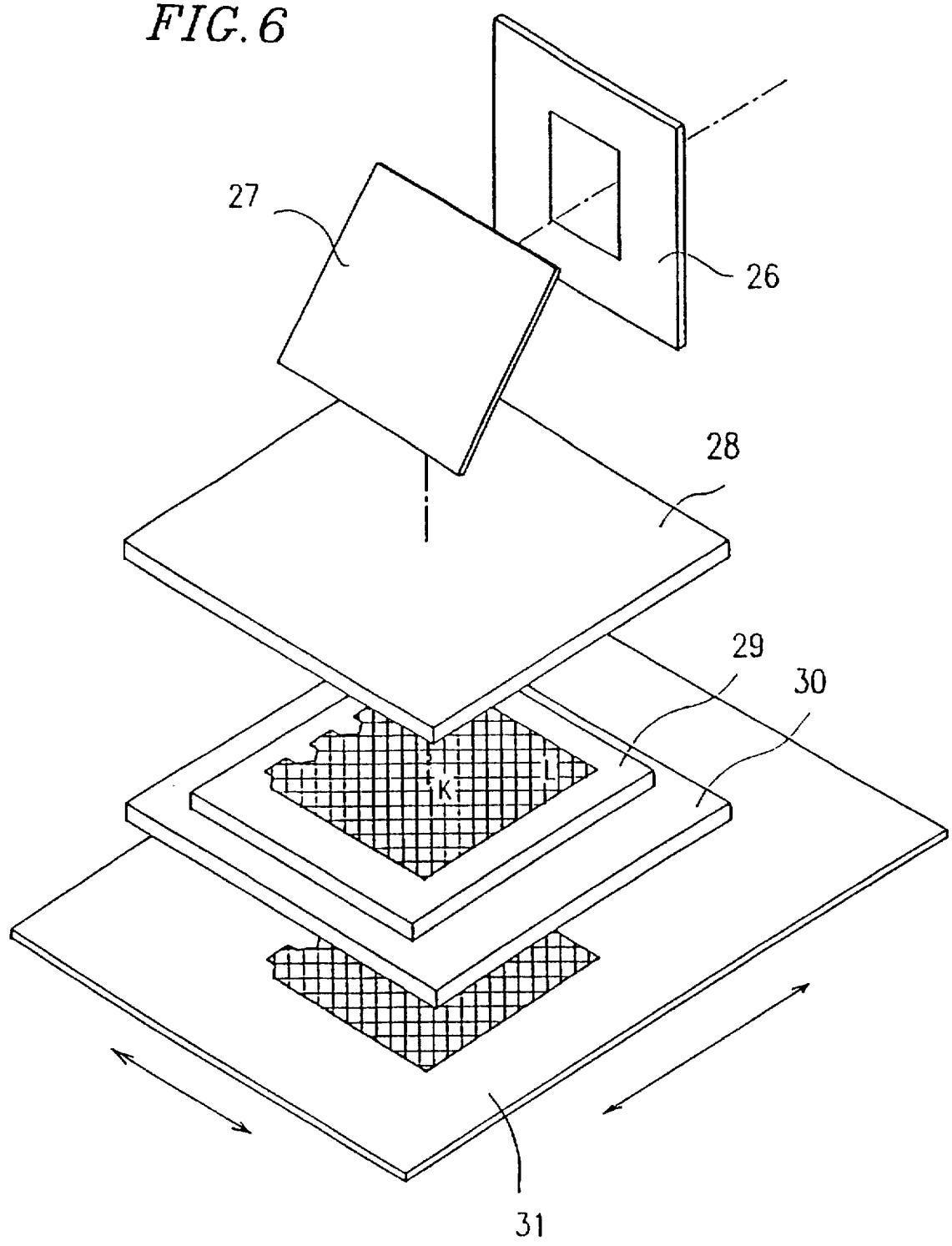
FIG. 6 is a perspective view schematically illustrating a stepper exposure.

FIG. 6 schematically shows a stepper exposure. The g beams and h beams which have been emitted from an extra-high pressure mercury lamp and then converged through an interference filter are passed through a reticle blind 26 such that the light is irradiated onto a required exposure area, reflected by an optical mirror 27 onto a condenser lens 28, passed through a reticle 29 and a projector lens 30 on which necessary patterns are drawn and then incident onto a glass substrate 31 on which a photoresist has been applied.

In the case of exposing a plurality of patterns on the same substrate to light, the exposure processes are repeatedly performed by sequentially moving the substrate 31.

Figure 7A:
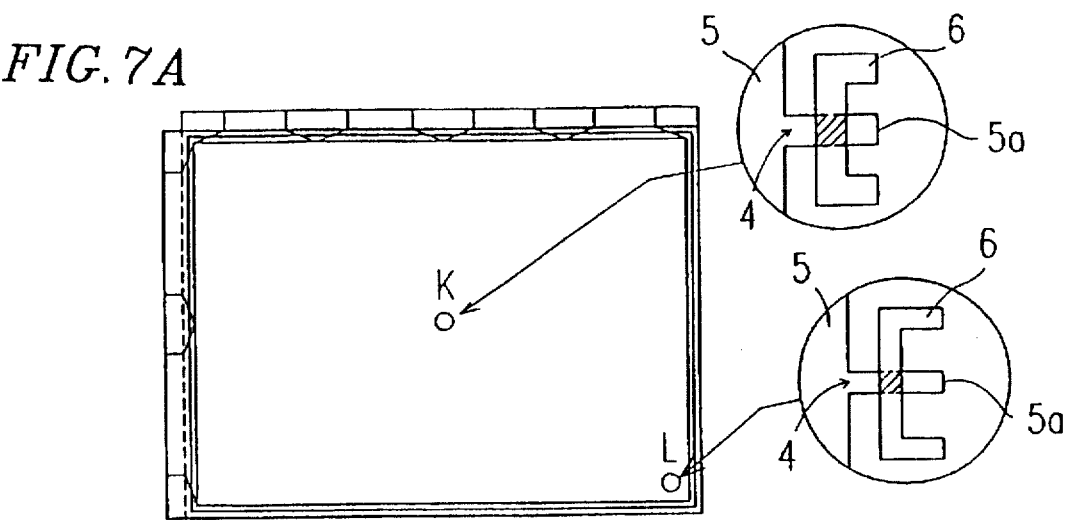
FIGS. 7A through 7C are diagrams illustrating exemplary distributions of the MIM elements having different finish sizes.
Figure 7B:
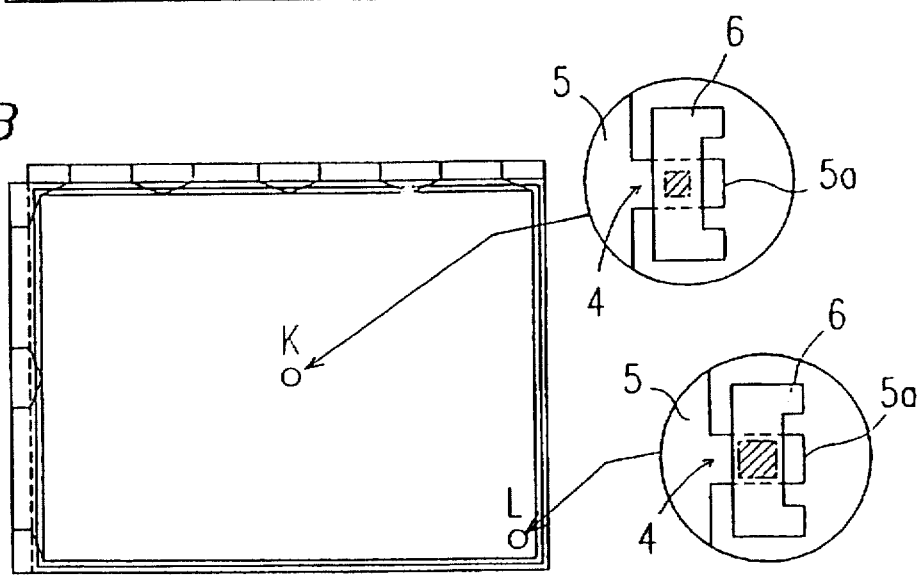

During the exposure process, the outgoing beams reach the substrate 31 through an optical system including a plurality of optical mirrors and lenses. Thus, if the optical system has not been satisfactorily adjusted or if something is wrong with the optical system, then the pattern projected onto the substrate 31 is distorted. For example, in the case of using a positive photoresist and a mask, the size of an element located at the center K of a pixel region becomes sometimes different from that of an element located at a corner L of the pixel region as shown in FIG. 7A. More specifically, the finish line width of the element at the center K becomes larger than that of the element at the corner L. In a conventional MIM element structure, the area of an element is more likely to be decreased because both the line widths of the lower electrode 5a and the upper electrode 6 are likely to be decreased. As a result, in a conventional liquid crystal display device, a nonuniform image having point defects is likely to be displayed.

In addition, a similar phenomenon is possibly caused in an element having a structure including a contact hole (FIG.

7B). In such a case, since the area of the surrounding contact hole (or the area of an element) becomes larger, point defects are also caused.

Nevertheless, since the variation in finish sizes of the elements is very small, it is difficult to find such a variation in the middle of the fabrication process. Therefore, in some cases, such a variation cannot be found until the operation test of the elements are performed.

Figure 7C:
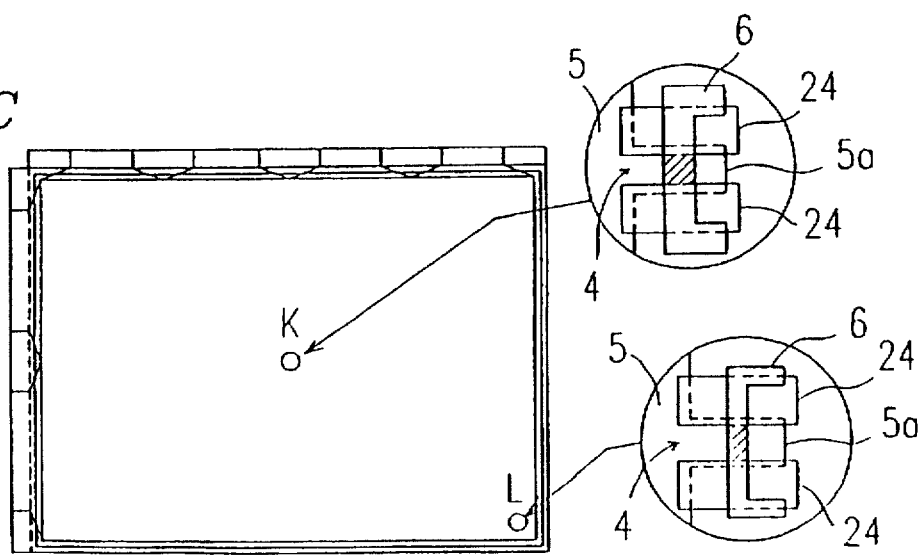

However, as shown in FIG. 7C, the structure in which the upper electrode 6 is connected to the first insulating film 8 having non-linearity and the first insulating film 8 is connected to the lower electrode 5a via a slit as used in the MIM element of the present invention can effectively reduce such a variation in areas of the elements. More specifically, when an exposure process is performed, the finish width of the slit 25 of the second insulating film 24 and the finish line width of the upper electrode 6 determining the area of an element are in an inversely proportional relationship. Thus, when the width of the slit 25 becomes larger than a designed value, the line width of the upper electrode 6 becomes smaller than the designed value thereof. Since the upper electrode 6 with a reduced line width is connected to the first insulating film 8 via the slit 25 with an increased width, the difference between the area of a resulting MIM element at a center of a pixel region and that of a resulting MIM element at a corner thereof can be reduced. As a result, the variation in areas of the elements owing to the erroneous projection during the exposure process can be suppressed.

After the lower electrode 5a, the second insulating film 24, the first insulating film 8 and the upper electrode 6 have been formed in such a manner, ITO or the like to be a pixel electrode 7 is patterned into a predetermined shape, thereby forming one pixel.

Thereafter, an alignment film (not shown) is formed on the element substrate 2 and then subjected to a rubbing treatment, while a counter electrode and an alignment film are formed on a counter substrate 3 and the film is also subjected to a rubbing treatment. Then, these substrates 2 and 3 are attached to each other and a liquid crystal material is injected into the gap between these substrates 2 and 3 to form a liquid crystal layer. Finally, polarizers are attached to both outer surfaces of the liquid crystal cell thus formed, thereby completing a liquid crystal display device.

EXAMPLE 2

In the first example, after the slit 25 is formed by patterning the second insulating film 24, the first insulating film 8 is formed by anodizing the surface of the lower electrode 5a in the region corresponding to the slit 25. Alternatively, an MIM element having a structure including a slit may also be fabricated by inverting the order in which the second insulating film 24 and the first insulating film 8 are formed.

Figure 8A:
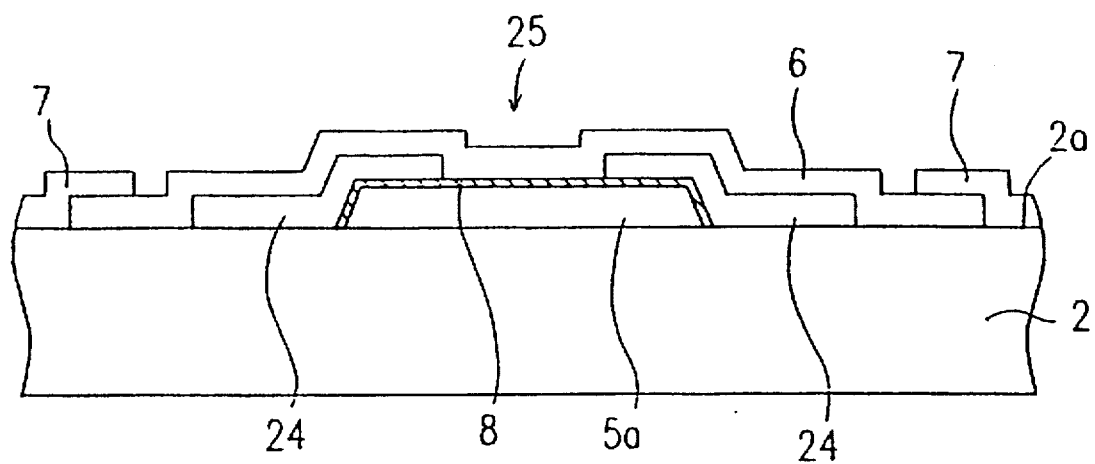
FIGS. 8A and 8B are cross-sectional views of the element substrate of the liquid crystal display device in the second example of the present invention.
Figure 8B:
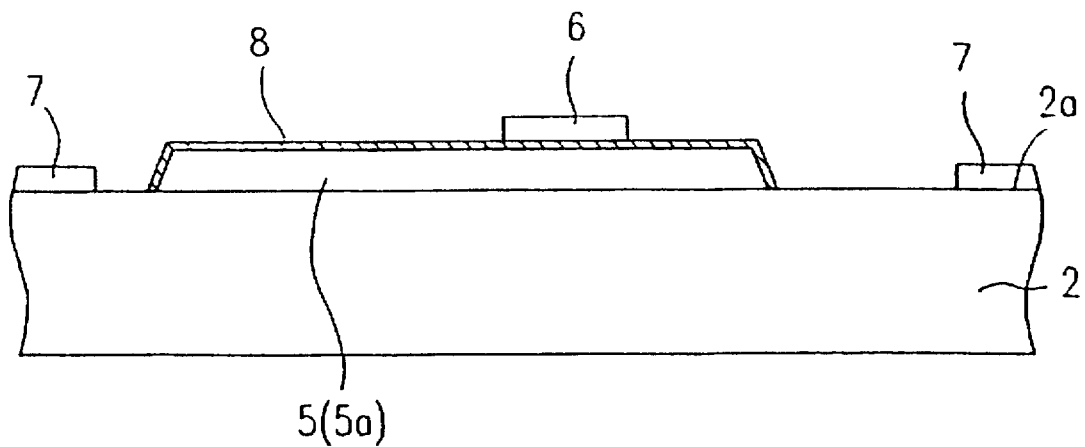

FIGS. 8A and 8B are cross-sectional views of the element substrate 2 respectively taken along the lines 3A—3A and 3B—3B shown in FIG. 1 in the case where the first insulating film 8 is first formed and then the second insulating film 24 is formed. In this second example, the etching edges of the lower electrode 5a are covered with not only the second insulating film 24 but also the first insulating film 8, unlike the first example in which the etching edges of the lower electrode 5a are covered with the second insulating film 24 only.

Hereinafter, the process steps for fabricating the element substrate 2 shown in FIGS. 8A and 8B will be described with reference to FIGS. 9A to 9E.

First, a metal thin film (e.g., a Ta thin film) to be the signal line 5 and the lower electrode 5a is formed on the surface 2a of a glass substrate 2 (the element substrate) and then patterned into a predetermined shape (FIG. 9A). In this example, a fusion pyrex glass substrate (Corning #7059) was used as the glass substrate 2 as in the first example.

It is noted that a base coating film made of an insulating material such as tantalum pentoxide may be formed on the surface 2a of the glass substrate 2 before the Ta thin film is formed, though such a film is not shown in FIG. 9A.

The Ta thin film was deposited to be about 300 nm thick by a DC sputtering method using a sintered target of Ta containing about 2 to about 10 mol % of nitrogen and then patterned into a predetermined shape by a dry etching method using $CF_4$ and $O_2$.

It is noted that since the capacitance $C_{MIM}$ of the MIM element 4 does not depend upon the line width of the lower electrode 5a, it is not always necessary to use a dry etching method having high etching precision as mentioned above. Alternatively, the Ta thin film may be patterned by a wet etching method using nitrate fluoride or the like. Since the process speed is accelerated in such a case, the latter method is preferable in view of the throughput.

Subsequently, a first insulating film 8 is formed by anodizing the surface of the lower electrode 5a (FIG. 9B). In this example, the anodization was performed at about 25° C. by using a 1% ammonium tartrate solution as an electrolytic solution, supplying formation current of about 0.18 mA/cm$^2$ to the area to be anodized and applying a formation voltage of about 31 V, thereby obtaining an anodized film having a thickness of about 60 nm.

Next, a second insulating film 24 to be the intermediate insulating layer is deposited thereon and then patterned into a stripe shape along the protruding direction of the lower electrode 5a such that the second insulating film 24 is left so as to cover the regions surrounding the etching edges of the lower electrode 5a, thereby providing a slit-shaped contact 25 (FIG. 9C). The second insulating film 24 is deposited at such a temperature that the first insulating film 8 can function as an insulating film of the MIM element. The present inventors found based on the experimental results that when the $Ta_2O_5$ film to be the first insulating film 8 is exposed to a temperature equal to or higher than about 250° C., the characteristics of the MIM element having such a structure as that used in the second example (the non-linearity thereof, in particular) are too deteriorated for practical use. Thus, in the case of forming the first insulating film 8 before the second insulating film 24 for protecting the etching edges of the lower electrode 5a is formed, the temperature at which the second insulating film 24 is deposited must be set at such a temperature as not to damage the properties of the first insulating film 8 (for example, when the first insulating film 8 is made of $Ta_2O_5$ as in this example, the temperature should be set at equal to or lower than about 250° C.). So long as the temperature is set at such an appropriate value, the second insulating film 24 may be deposited by any arbitrary method.

In this example, a silicon dioxide film was formed as the second insulating film 24 at about 200° C. by a sputtering method and then patterned into a predetermined shape by a wet etching method using buffered hydrofluoric acid. Alternatively, the second insulating film 24 may be patterned by a dry etching method, instead of the wet etching method.

Since a double protection is provided for the etching edges of the lower electrode 5a by the first insulating film 8 and the second insulating film 24, the second insulating film 24 may be deposited by a sputtering method by which pin holes are likely to be caused.

After the second insulating film 24 is formed by patterning in such a manner, a thin film made of Ti or the like is formed over the surface 2a of the substrate 2 and then patterned, thereby obtaining the upper electrode 6 (FIG. 9D). In this way, an MIM element 4 including the lower electrode 5a, the first insulating film 8 and the upper electrode 6 can be obtained as a two-terminal nonlinear element.

In this MIM element 4 of the second example, the upper electrode 6 is connected to the first insulating film 8 and the lower electrode 5a is connected to the first insulating film 8 via the slit 25 as in the first example. As a result, the area in which the additional capacitance $C_{add}$ has been inevitably generated can be geometrically minimized. Hereinafter, specific values of the element capacitance $C_{MIM}$ and the additional capacitance $C_{add}$ to be generated will be calculated under the following conditions:

Element structure: FIG. 8A
Finish line width of lower electrode 5a: about 10 μm
Finish line width of upper electrode 6: about 4 μm
Finish width of slit 25: about 4 μm
Film thickness ($d_{Ta2O5}$) and dielectric constant ($\epsilon_{Ta2O5}$) of first insulating film 8 ($Ta_2O_5$): about 60 nm, about 20
Film thickness ($d_{SiO2}$) and dielectric constant ($\epsilon_{SiO2}$) of second insulating film 24 ($SiO_2$): about 200 nm, about 4

When these numerical values are used, the original area $S_{MIM}$ of the MIM element becomes about 16 μm$^2$ and the area of the additional capacitor $S_{add}$ (hatched portions G (see FIG. 2)) becomes about 24 μm$^2$ (=4×3+4×3). Thus, considering the double structure made of tantalum pentoxide and silicon dioxide, the additional capacitance $C_{add}$ is represented by:

$$C_{add} = C_{MIM} \times \{(S_{add} \cdot \epsilon_{Ta2O5} \cdot \epsilon_{SiO2}) / (\epsilon_{SiO2} \cdot d_{Ta2O5} + \epsilon_{Ta2O5} \cdot d_{SiO2})\} /$$
$$\{(\epsilon_{Ta2O5} \cdot S_{MIM}) / d_{Ta2O5}\}$$

$$\approx C_{MIM} \times 0.0849$$

That is to say, the additional capacitance $C_{add}$ becomes about 8% of the natural capacitance $C_{MIM}$ of the element. Thus, it is seen that the initial value of the capacitance ratio $C_{LC}/C_{MIM}$ (=10) is only slightly decreased to about 9.3 ($\approx 10/(1+0.08)$).

In a conventional MIM element in which the finish width of the upper electrode is set at about 10 μm and the finish area of the contact hole is set to be about 4 μm×4 μm, $C_{add}$ may be calculated based on the abovedescribed equation while assuming the area $S_{add}$ of the additional capacitor to be about 84 μm$^2$. Thus, $$C_{add} = C_{MIM} \times 0.297$$

In other words, the initial capacitance ratio $C_{LC}/C_{MIM}$ of about 10 is considerably decreased to about 7.7 ($\approx 10/(1+0.30)$) in the conventional MIM element. However, in the MIM element of the present invention, the capacitance ratio can be improved from about 7.7 to about 9.3.

In this example, so long as a relation $C_{add} \leq C_{MIM} \times 0.25$ is satisfied, the overlap margin between the lower electrode 5a and the second insulating film 24 and the line width of the upper electrode 6 can be increased. As a result, the MIM element can be fabricated more flexibly.

In this example, the second insulating film 24 is assumed to be shaped so as to include two stripes. Alternatively, the slit may be formed in any of the shapes shown in FIGS. 5A to 5C, thereby improving the pattering precision of the second insulating film 24 or suppressing the disconnection of the upper electrode 6.

After the upper electrode 6 is formed in such a manner, a thin film made of a transparent conductive material such as indium-tin-oxide (ITO) is further formed over the surface 2a of the element substrate 2 and then patterned into a predetermined shape, thereby forming a plurality of pixel electrodes 7 arranged in matrix (FIG. 9E).

Thereafter, an alignment film (not shown) is formed on the element substrate 2 and then subjected to a rubbing treatment, while a counter electrode and an alignment film are formed on a counter substrate 3 and the film is also subjected to a rubbing treatment. Then, these substrates 2 and 3 are attached to each other and a liquid crystal material is injected into the gap between these substrates 2 and 3 to form a liquid crystal layer. Finally, polarizers are attached to both outer surfaces of the liquid crystal cell thus formed, thereby completing a liquid crystal display device.

As described above, in the liquid crystal display device of the second example, since the upper electrode is also connected to the first insulating film having nonlinear current-voltage characteristics via a slit as in the first example, the area in which the additional capacitance is generated can be geometrically minimized. Thus, it is possible to prevent the capacitance ratio $C_{LC}/C_{MIM}$ from being decreased from the designed value owing to the generation of the additional capacitance.

Moreover, since the size of an MIM element is determined depending upon the width of the slit 25 and the line width of the upper electrode 6 and the finish width of the slit 25 and the finish line width of the upper electrode 6 are with respect to the exposure in an inversely proportional relationship, the degree of the decrease in area of the MIM element from the designed value can be reduced.

Furthermore, because of the same reasons, the variation in sizes of the MIM elements on the same substrate owing to the erroneous projection during the exposure process can be suppressed. As a result, a non-uniformly displayed image having point defects can be eliminated.

EXAMPLE 3

Figure 10:
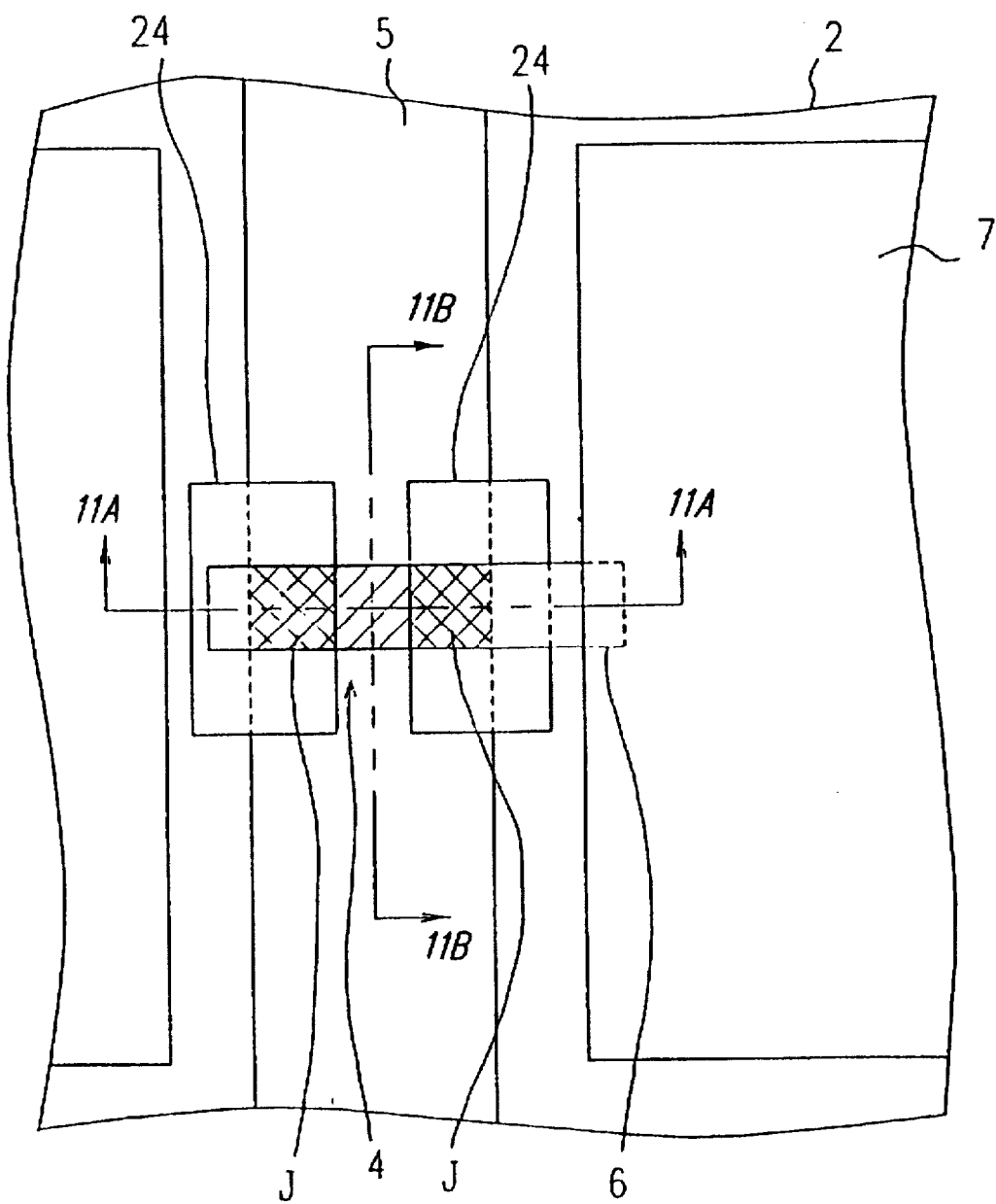
FIG. 10 is a plan view of an element substrate of the liquid crystal display device in the third example of the present invention.
Figure 11A:
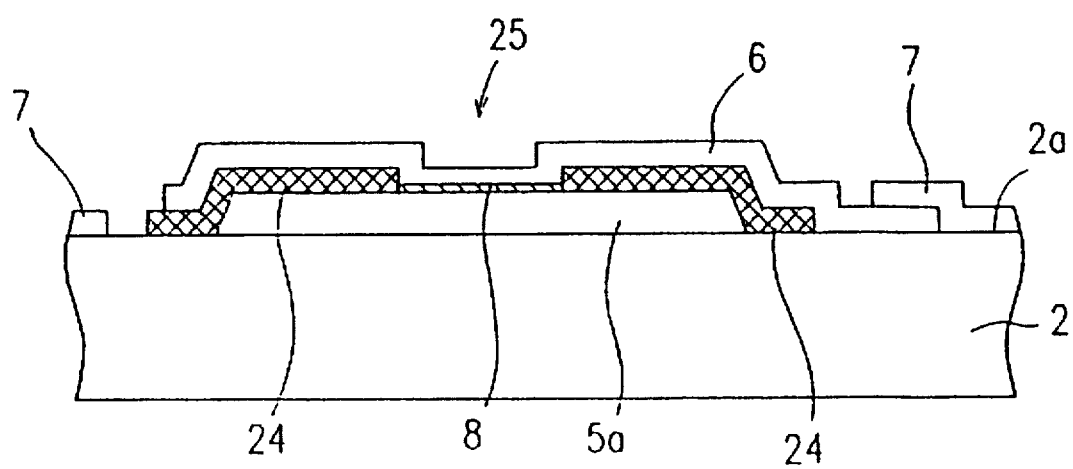
FIG. 11A is a cross-sectional view of the element substrate of the liquid crystal display device of the third example taken along the line 11A—11A shown in FIG. 10.
Figure 11B:
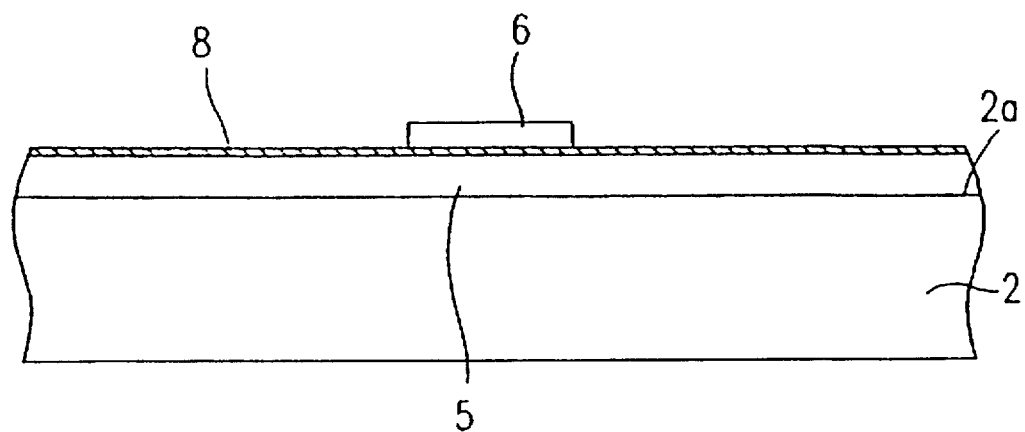
FIG. 11B is a cross-sectional view of the element substrate taken along the line 11B—11B shown in FIG. 10.

FIG. 10 is a plan view of an element substrate of the liquid crystal display device in the third example of the present invention. FIGS. 11A and 11B are cross-sectional views of the element substrate taken along the lines 11A—11A and 11B—11B shown in FIG. 10.

In the first and the second examples, a branched portion protruding from the signal line 5 is used as the lower electrode 5a of the MIM element 4. However, in the case of forming an element having a structure in which the etching edges of the lower electrode 5a are not used, the line width of the lower electrode 5a is required to be set at a larger value beforehand for dealing with an error caused by the misalignment of the patterns or an error caused by an excessive etching or the like. Thus, assuming that the line width of the signal line 5 is substantially equal to that of the lower electrode 5a, it is no longer necessary to use the branched portion of the signal line 5 as the lower electrode 5a. As a result, a part of the signal line 5 may be used as the lower electrode 5a.

In other words, a part of the space which has been assigned to the lower electrodes 5a in the display portion for forming the MIM elements is no longer necessary. Thus, the area of each of the pixel electrodes 7 can be increased so that the numerical aperture can be improved. On the other hand, in the case of a reflective liquid crystal display device, a brighter image can be displayed. Furthermore, in the case of a transmission type liquid crystal display device, the luminance of the back light can be reduced so that the power consumption can be reduced.

FIG. 10 is a plan view of the element substrate when a part of the signal line 5 is used as the lower electrode 5a of the MIM element 4. As shown in FIG. 10, in this third example, the branched portion 5a is not provided, but the MIM element 4 is provided just over the signal line 5. The second insulating film 24 is provided in a stripe shape over the vicinity of the etching edges of the signal line 5 so as to be parallel to the signal line 5. On the other hand, the upper electrode 6 is formed in a direction vertical to the signal line 5 (i.e., in the direction vertical to the stripes of the second insulating film 24) and the pixel electrode 7 is connected to one terminal of the upper electrode 6.

The element substrate of the third example may be formed by substantially the same process steps (not shown) as those used in the first example.

First, a metal thin film (e.g., a Ta thin film) to be the signal line 5 is formed on the surface 2a of a glass substrate 2 and then patterned into a predetermined shape. In this example, a fusion pyrex glass substrate (Corning #7059) was used as the glass substrate 2. It is noted that a base coating film made of an insulating material such as tantalum pentoxide may be formed on the surface 2a of the glass substrate 2 before the Ta thin film is formed, though such a film is not shown in any figure.

The Ta thin film was deposited to be about 300 nm thick by a DC sputtering method using a sintered target of Ta containing about 2 to about 10 mol % of nitrogen and then patterned into a predetermined shape by a dry etching method using $CF_4$ and $O_2$, thereby obtaining the signal line 5.

It is noted that, as in the case of the first and the second examples, it is not always necessary to use a dry etching method having high etching precision. Alternatively, the Ta thin film may be patterned by a wet etching method using nitrate fluoride or the like. Since the process speed is accelerated by a wet etching method, this method is preferable in view of the throughput.

Next, a second insulating film 24 to be the intermediate insulating layer is deposited over the surface 2a of the substrate and then patterned into a stripe shape over the portions surrounding the etching edges of the signal line 5 in the vicinity of the region where the element is to be formed, thereby providing a slit-shaped contact 25.

In this example, a silicon nitride film was formed as the second insulating film 24 to be about 300 nm thick at 350° C. by a P-CVD method and then patterned into a predetermined shape by a wet etching method using buffered hydrofluoric acid. Alternatively, the second insulating film 24 may be patterned by a dry etching method, instead of the wet etching method.

Subsequently, a first insulating film 8 is formed on the portion of the signal line 5 which is not covered with the second insulating film 24 by an anodization method. In this example, the anodization was performed at about 25° C. by using a 1% ammonium tartrate solution as an electrolytic solution, supplying a formation current of about 0.18 mA/cm$^2$ to the area to be anodized and applying a formation voltage of about 31 V, thereby obtaining an anodized film having a thickness of about 60 nm.

After the anodization is performed in this manner, the upper electrode 6 is formed of Ti or the like, thereby obtaining a two-terminal nonlinear element including the signal line 5 (functioning also as the lower electrode), the first insulating film 8 and the upper electrode 6.

In the MIM element 4 of the third example, the upper electrode 6 and the part of the signal line 5 are connected to the first insulating film 8 via the slit 25. As a result, the area in which the additional capacitance $C_{add}$ has been inevitably generated can be geometrically minimized as indicated by the regions J shown in FIG. 10. That is to say, as compared with a conventional structure in which an upper electrode is connected to an insulator via a contact hole, the additional capacitance of the MIM element of this third example is smaller. Thus, it is possible to minimize the decrease in capacitance ratio $C_{LC}/C_{MIM}$ which leads to the decrease in contrast ratio of the liquid crystal display device and the increase in driving voltage thereof.

In addition, since the second insulating film 24 is formed in a stripe shape and a slit is provided therebetween, the connection defects caused by a residual film during the patterning process or the like can be eliminated from this structure.

In this example, the second insulating film 24 is assumed to be shaped so as to include two stripes. Alternatively, the contact slit may be formed in any of the shapes shown in FIGS. 5A to 5C.

After the upper electrode 6 has been formed in such a manner, a transparent conductive film made of ITO or the like is formed over the surface 2a of the substrate 2 and then patterned into a predetermined shape, thereby forming pixel electrodes 7 arranged in matrix.

Thereafter, an alignment film (not shown) is formed on the element substrate 2 and then subjected to a rubbing treatment, while a counter electrode and an alignment film are formed on a counter substrate 3 and the film is also subjected to a rubbing treatment. Then, these substrates 2 and 3 are attached to each other and a liquid crystal material is injected into the gap between these substrates 2 and 3 to form a liquid crystal layer. Finally, polarizers are attached to both outer surfaces of the liquid crystal cell thus formed, thereby completing a liquid crystal display device.

In this third example, after the second insulating film (intermediate insulating layer) 24 has been formed, the anodization is performed for forming the first insulating film 8, in the same way as in the first example. Alternatively, the order of the process steps can be inverted in the same way as in the second example. That is to say, the second insulating film (intermediate insulating layer) 24 may also be formed after the first insulating film 8 has been formed by the anodization. In the latter case, a double protection can be provided for the etching edges of the lower electrode formed as a part of the signal line 5 by the first insulating film 8 and the second insulating film 24. It is noted that, in such a case, the temperature at which the second insulating film 24 is formed must be set at such a temperature as not to damage the properties of the first insulating film 8, as described in the second example.

In the foregoing first to third examples, the present invention has been described as being applied to a liquid crystal display device operating in TN mode. Alternatively, the two-terminal nonlinear element of the present invention may also be implemented in a phase-change type liquid crystal display device operating in GH mode in which a reflector is provided with a cell. Furthermore, the two-terminal nonlinear element of the present invention is naturally applicable to various types of liquid crystal display devices using two-terminal nonlinear elements and operating in other optical modes including a liquid crystal display device provided with a single polarizer, a polymer dispersed liquid crystal display device and the like.

Also, the second insulating film (intermediate insulating layer) 24 is assumed to be made of a metal oxide or a metal nitride. However, the usable materials are not limited thereto so long as a material having a small dielectric constant and some electric breakdown voltage is used. For example, an organic material having some insulation property may also be used. Furthermore, a single layered insulating film is used as the intermediate insulating layer in the foregoing examples. However, the intermediate insulating layer is not necessarily required to be a single layer. For example, a multilayer film including a film made of a material having excellent adhesiveness (the insulation properties thereof may be poor) to an underlying film and an insulating film having excellent breakdown voltage may be used.

As is apparent from the foregoing description, in the liquid crystal display device of the present invention, the connection between the lower electrode and the insulating film having nonlinear current-voltage characteristics and the connection between the upper electrode and the insulating film are accomplished via a contact slit, and the portions over the etching edges of the lower electrode in which the insulation breakdown is likely to be caused are not used as a part of the element so that the point defects can be suppressed.

In addition, by using the contact slit, the capacitance inevitably added to an MIM element can be minimized. Thus, it becomes easier to secure such a ratio of the capacitance of the liquid crystal layer to that of an element as not to adversely affect a displayed image. Moreover, it is also possible to suppress the connection defects easily caused in an MIM element having a structure in which an insulator is connected to an upper electrode via a contact hole because of the residual film.

Also, an MIM element can be formed just over a signal line by using a part of the signal line as a lower electrode so that the luminance of a liquid crystal display device can be increased.

Furthermore, the variation in areas of the elements owing to the distorted image projection during the exposure process can be eliminated because the width of the contact slit and the line width of the upper electrode are finished so as to be complementarily corrected thanks to the contact slit. As a result, a non-uniformly displayed image can be eliminated.

Hereinafter, the embodiments of the switching element according to the present invention will be described as the fourth to the seventh examples.

EXAMPLE 4

Figure 12A:
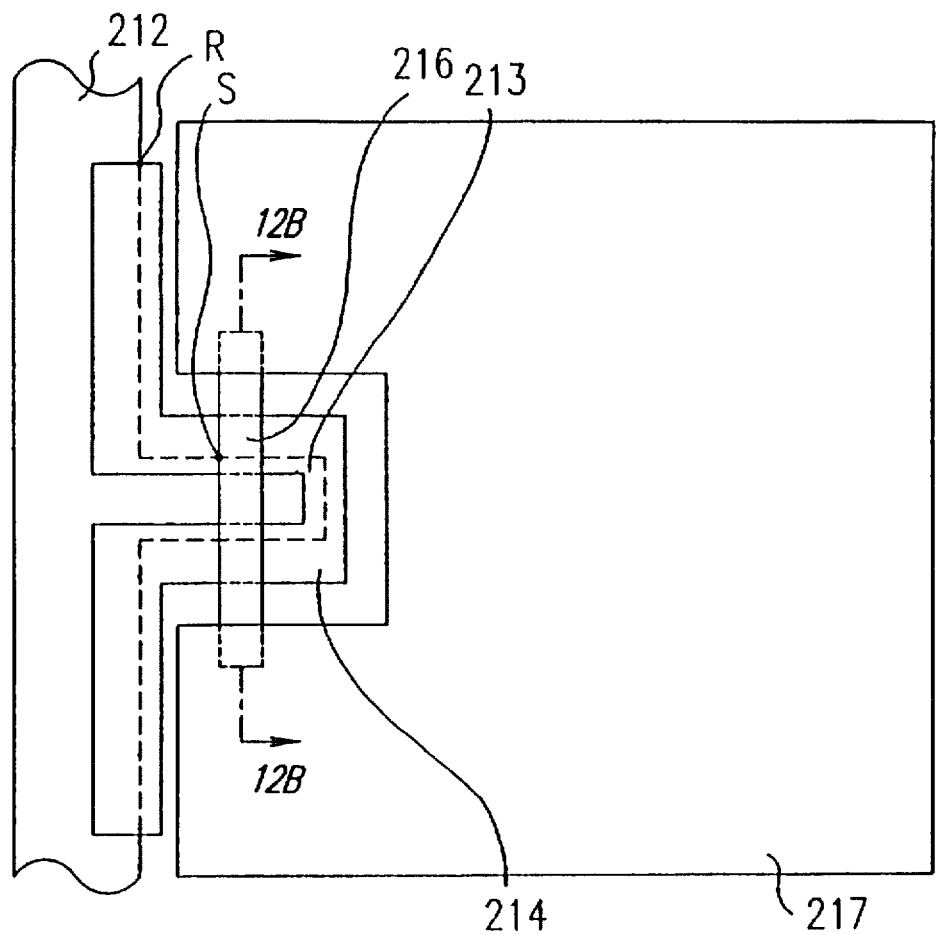
FIG. 12A is a plan view showing the switching element in the fourth example of the present invention.
Figure 12B:
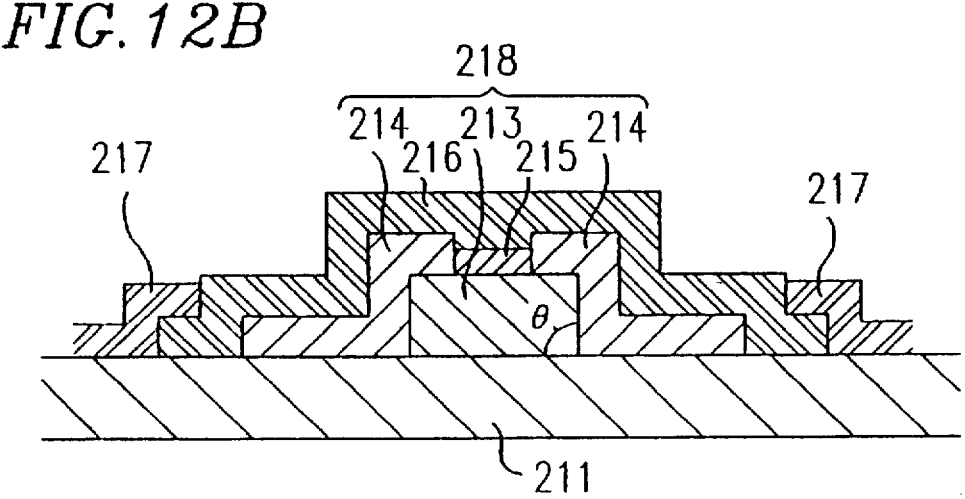
FIG. 12B is a cross-sectional view of the switching element taken along the line 11B—11B shown in FIG. 12A.

FIGS. 12A and 12B illustrate a switching element in the fourth example of the present invention. FIG. 12A is a plan view of the switching element, while FIG. 12B is a cross-sectional view of the switching element taken along the line 12B—12B shown in FIG. 12A.

The switching element is an MIM element to be included within one pixel of a liquid crystal display device to be driven by an active matrix fashion.

Hereinafter, the process steps for fabricating this switching element will be described. First, a first metal layer (e.g., a Ta thin film) having a thickness of about 3000 Å is deposited on a glass substrate 211 by a sputtering method or the like, and then patterned by a photolithography method, thereby forming a signal line 212 and a lower electrode 213.

Next, a silicon nitride film having a thickness of about 2500 Å is deposited thereon at about 300° by a P-CVD method, and then patterned by a photolithography method, thereby forming a second insulating film 214.

Thereafter, the surface of the lower electrode 213 is anodized, thereby forming a first insulating film 215 made of tantalum pentoxide having a thickness of about 600 Å.

Then, a second metal layer (e.g., a Ti thin film) having a thickness of about 4000 Å is deposited over the entire surface of the substrate 211 by a sputtering method or the like, and then patterned by a photolithography method, thereby forming an upper electrode 216.

Subsequently, a transparent conductive film made of ITO or the like is deposited and then patterned, thereby forming a pixel electrode 217.

In this structure thus fabricated, the first insulating film 215 has nonlinear resistance characteristics and the switching element 218 is formed at the site where the lower electrode 213, the first insulating film 215 and the upper electrode 216 are stacked. The size of the switching element 218 is about 5 μm×5 μm.

In the switching element of the fourth example, the following effects can also be attained, in addition to those attained by the first to the third examples.

Figure 13:
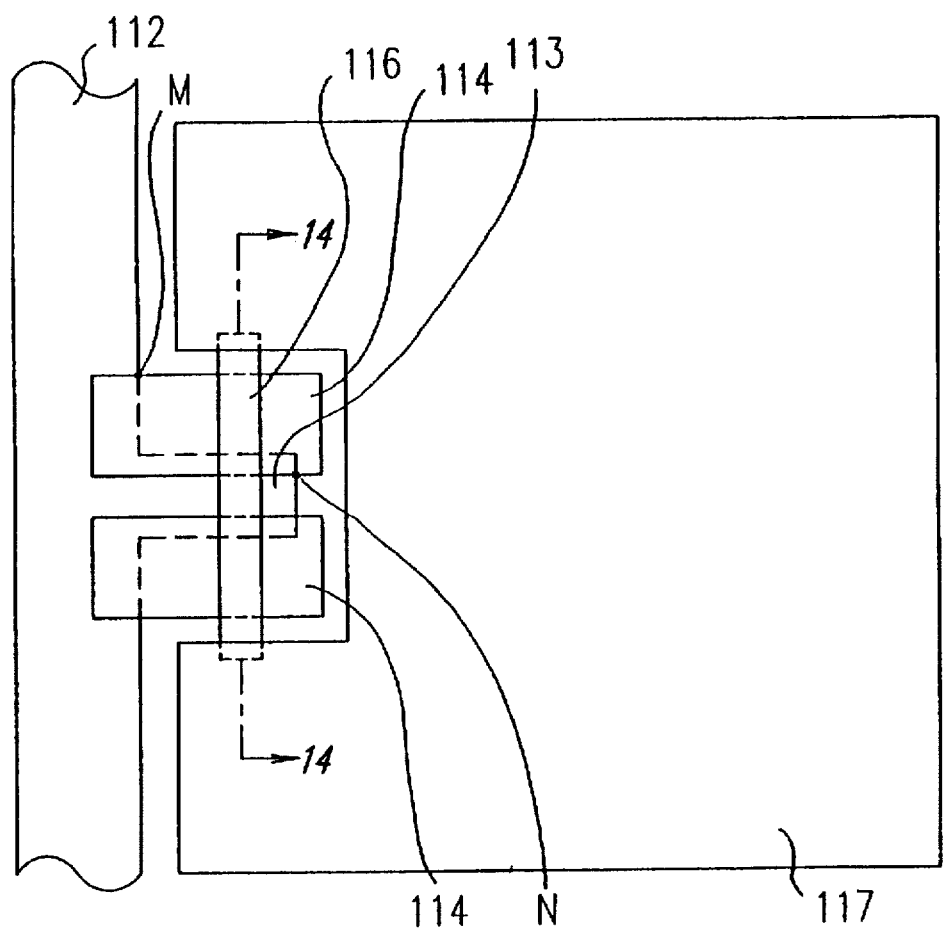
FIG. 13 is a plan view showing an exemplary switching element.
Figure 14:
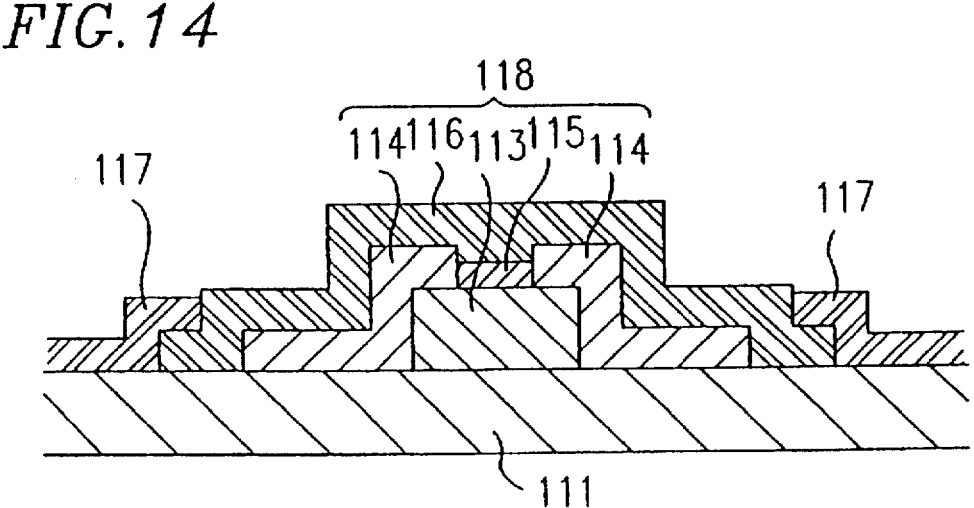
FIG. 14 is a cross-sectional view of the switching element shown in FIG. 13 taken along the line 14—14.

First, a switching element 118 having a structure shown in FIGS. 13 and 14 will be described. FIG. 14 is a cross-sectional view of the switching element 118 taken along the line 14—14 shown in FIG. 13. The adhesiveness of a second insulating film 114 to a signal line 112 and a lower electrode 113 is poor at the peripheral stepped portions of the signal line 112 and the lower electrode 113. Thus, when the second insulating film 114 is patterned, the etchant used for forming the second insulating film 114 permeates the second insulating film 114 at an intersection M between the periphery of the signal line 112 and the periphery of the second insulating film 114 and an intersection N between the periphery of the lower electrode 113 and the periphery of the second insulating film 114 as shown in FIG. 13. As a result, the second insulating film 114 at the periphery of the MIM element 118 is possibly eroded. However, according to the present invention, it is possible to prevent the second insulating film 114 from being eroded.

Figure 15:
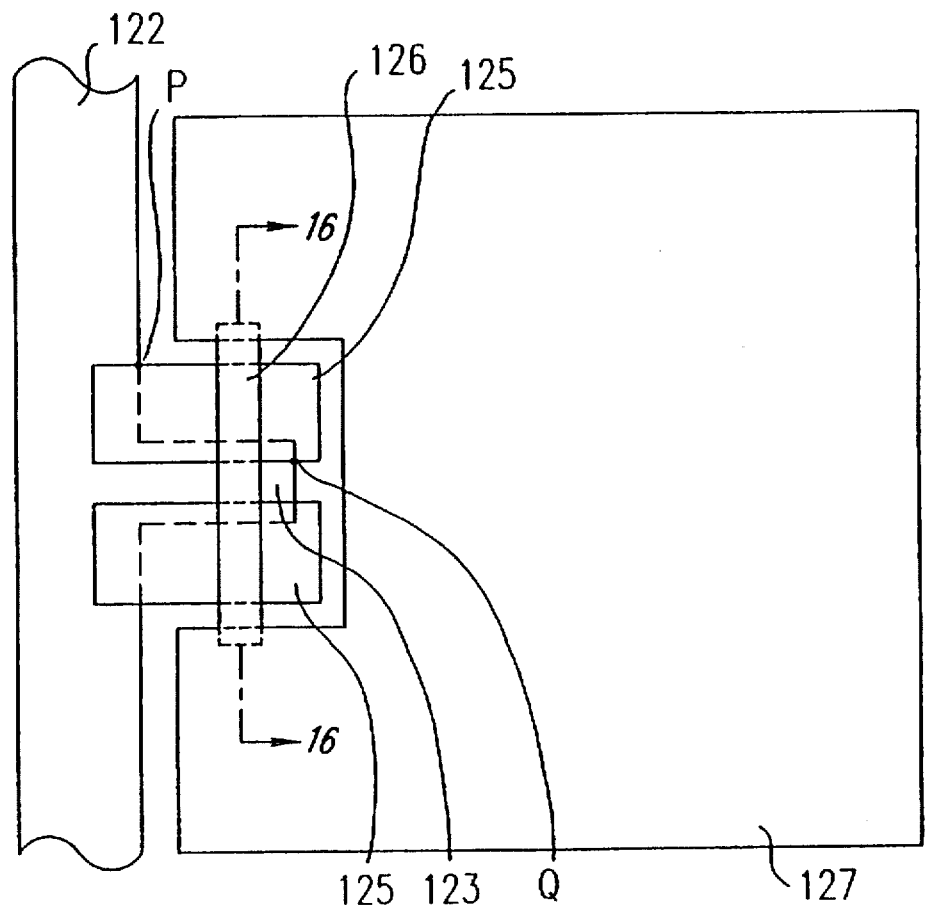
FIG. 15 is a plan view showing another exemplary switching element.
Figure 16:
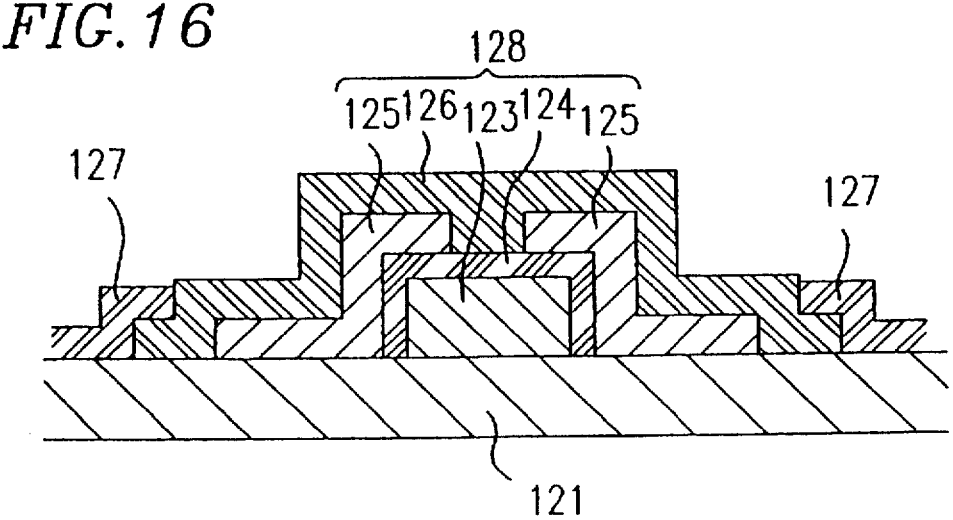
FIG. 16 is a cross-sectional view of the switching element shown in FIG. 15 taken along the line 16—16.

Similarly, the switching element 128 having another structure shown in FIG. 15 also has the possibility of such an erosion. FIG. 16 is a cross-sectional view of the switching element 128 taken along the line 16—16 shown in FIG. 15. The adhesiveness between a first insulating film 124 and a second insulating film 125 is poor at the peripheral stepped portions of the signal line 122 and the lower electrode 123. Thus, when the second insulating film 125 is patterned, the etchant permeates the portion between the first insulating film 124 and the second insulating film 125 at an intersection P between the periphery of the signal line 122 and the periphery of the second insulating film 125 and an intersection Q between the periphery of the lower electrode 123 and the periphery of the second insulating film 125 as shown in FIG. 15. As a result, the second insulating film 125 at the periphery of the MIM element 128 is possibly eroded. However, according to the present invention, it is possible to prevent the second insulating film 125 from being eroded.

In the structure shown in FIG. 12A, the second insulating film 214 is formed around the peripheral portions of the signal line 212 and the lower electrode 213 so as to surround the switching element 218. Stepped portions are formed around the peripheral portions of the signal line 212 and the lower electrode 213 and the adhesiveness of the second insulating film 214 to the signal line 212 and the lower electrode 213 becomes poor at the peripheral stepped portions. As a result, the etchant for forming the second insulating film 214 permeates the portion between the signal line 212 and the second insulating film 214 at an intersection R between the periphery of the signal line 212 and the periphery of the second insulating film 214 and flows from the intersection R along the peripheral portions of the signal line 212 and the lower electrode 213 into the site S of the switching element 218.

However, according to the present invention, since the distance between the intersection R and the site S of the switching element 218 along the peripheral portions of the signal line 212 and the lower electrode 213 is set to be about 5 μm, which is sufficiently longer than the maximum distance which the flowing etchant of the second insulating film 214 can reach during etching the second insulating film 214. As a result, the etchant does not reach the site S of the switching element 218.

Thus, the second insulating film 214 is not eroded by the etchant at the periphery of the switching element 218 so that the possibility of the generation of an insulation breakdown in the switching element 218 can be reduced.

In addition, in forming the signal line 212 and the lower electrode 213 from the first metal layer (Ta thin film), the taper angle θ (see FIG. 12B) at the edges of the peripheral portions of the signal line 212 and the lower electrode 213 may be set in a range from about 20° to about 80°. In such a case, since the peripheral portions of the signal line 212 and the lower electrode 213 are gently inclined, the adhesiveness between the second insulating film 214 and the peripheral portions of the signal line 212 and the lower electrode 213 can be improved at these edges. As a result, the permeation of the etchant into the site S of the switching element 218 can be prevented more surely.

Furthermore, since the second insulating film 214 is made of silicon nitride having a thickness of about 2500 Å, the time required for etching the second insulating film 214 can be shortened as compared with the case of forming a second insulating film to be thicker than about 3000 Å. Thus, before the etchant of the second insulating film 214 reaches the site S of the switching element 218, the etching process can be finished.

However, if the thickness of the second insulating film 214 is set to be less than about 1000 Å, then the natural insulation properties of the second insulating film 214 are damaged and some conductive properties are caused in the film 214 so that a failure is more likely to be caused in the switching element 218. Thus, the thickness of the second insulating film 214 is preferably set in a range from about 1000 Å to about 3000 Å, including 1000 Å and 3000 Å

EXAMPLE 5

Figure 17:
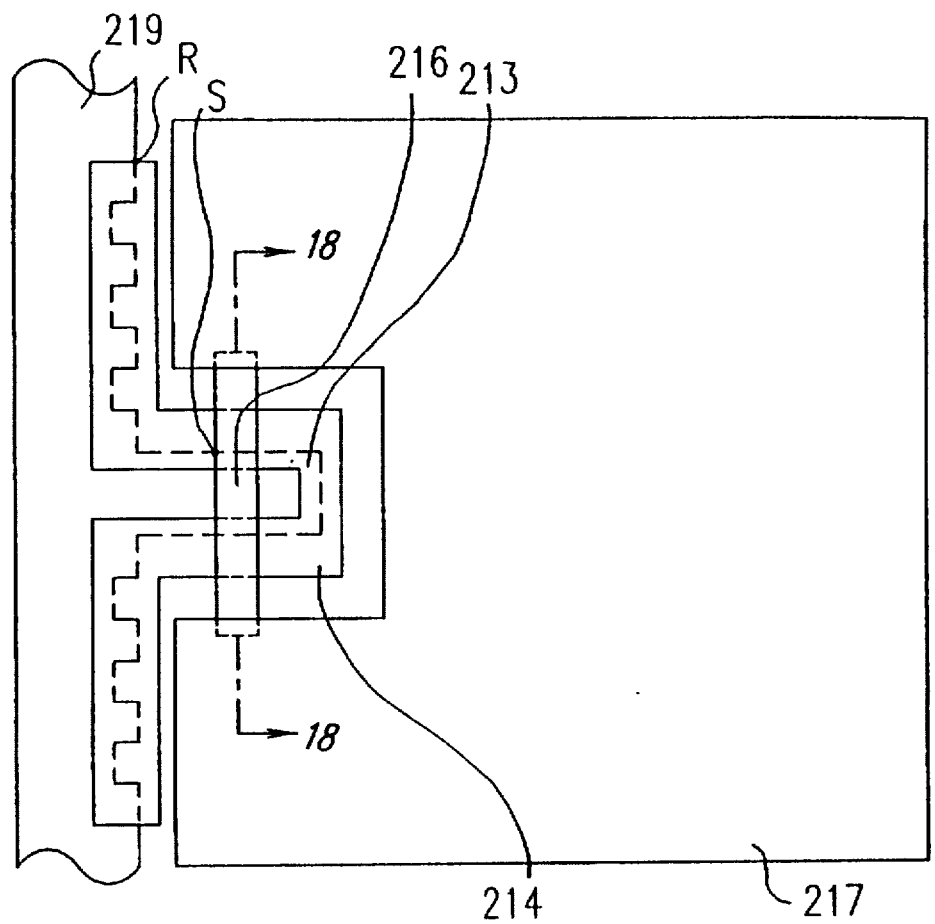
FIG. 17 is a plan view showing the switching element in the fifth example of the present invention.
Figure 18:
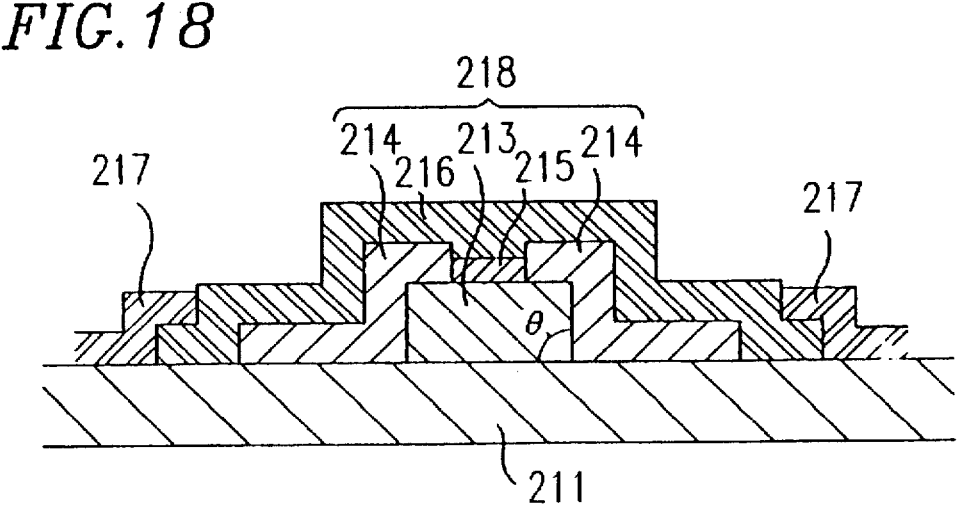
FIG. 18 is a cross-sectional view of the switching element taken along the line 18—18 shown in FIG. 17.

FIGS. 17 and 18 illustrates the switching element 218a in the fifth example of the present invention. FIG. 17 is a plan view of the switching element 218a, while FIG. 18 is a cross-sectional view of the switching element 218a taken along the line 18—18 shown in FIG. 17.

In this fifth example, a signal line 219 is provided instead of the signal line 212 shown in FIGS. 12A and 12B. The signal line 219 is characterized by including uneven portions in the periphery thereof.

In this configuration, the etchant of the second insulating film 214 also flows along the periphery of the signal line 219 during the etching process. However, since the periphery of the signal line 219 is uneven, the etchant must go through the uneven portions. In other words, the path through which the etchant flows becomes longer. The etchant path can be made sufficiently long even if the size (or the width measured in the direction parallel to the signal line 219) of the second insulating film 214 is set to be smaller. As a result, the distance between the intersection R and the site S of the switching element 218a along the peripheral portions of the signal line 219 and the lower electrode 213 can be set to be equal to or longer than about 5 μm. In addition, if the uneven portions are provided in the periphery of the signal line 219, the etchant cannot reach the site S of the switching element 218a easily. As a result, the permeation of the etchant into the site S of the switching element 218a can be prevented more surely.

It is noted that the uneven peripheral portions of the signal line 219 may be formed in any arbitrary shape.

Moreover, the taper angle θ (see FIG. 18) at the edges of the peripheral portions of the signal line 219 and the lower electrode 213 may also be set in a range from about 20° to about 80°.

Furthermore, the time required for etching the second insulating film 214 can be shortened by setting the thickness of the second insulating film 214 to be about 2500 Å without damaging the insulation properties of the second insulating film 214.

EXAMPLE 6

Figure 19:
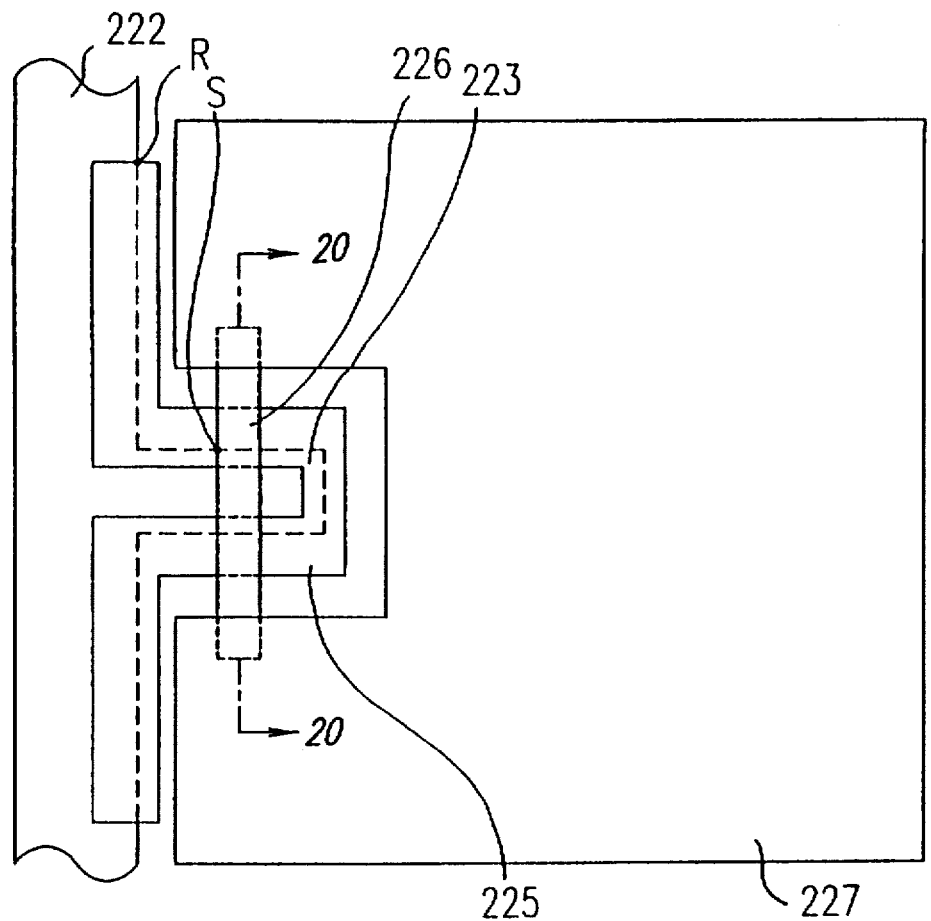
FIG. 19 is a plan view showing the switching element in the sixth example of the present invention.
Figure 20:
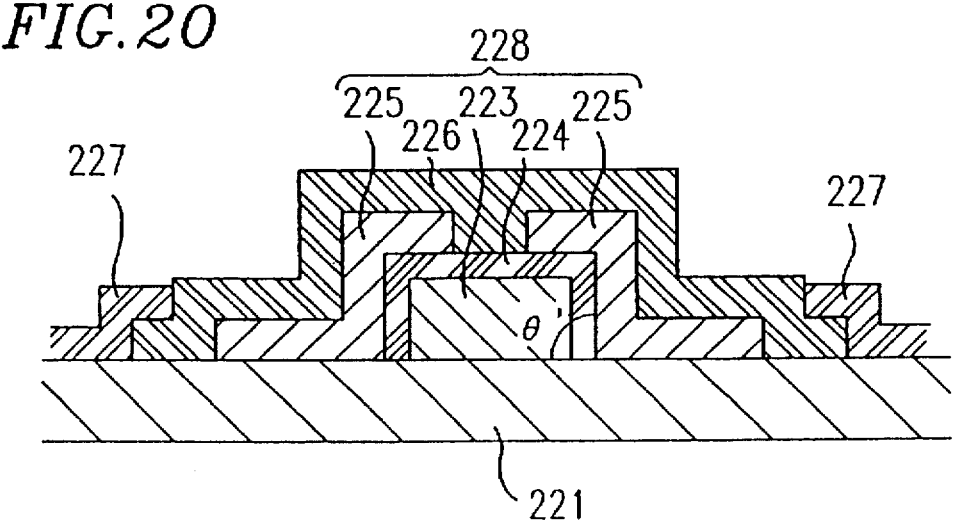
FIG. 20 is a cross-sectional view of the switching element taken along the line 20—20 shown in FIG. 19.

FIGS. 19 and 20 illustrate a switching element in the sixth example of the present invention. FIG. 19 is a plan view of the switching element 228, while FIG. 20 is a cross-sectional view of the switching element 228 taken along the line 20—20 shown in FIG. 19.

Hereinafter, the process steps for fabricating this switching element 228 will be described. First, a first metal layer (e.g., a Ta thin film) having a thickness of about 3000 Å is deposited on a glass substrate 221 by a sputtering method or the like, and then patterned by a photolithography method, thereby forming a signal line 222 and a lower electrode 223.

Next, the surface of the lower electrode 223 is anodized, thereby forming a Nfirst insulating film 224 made of tantalum pentoxide having a thickness of about 600 Å.

Thereafter, a silicon nitride film having a thickness of about 2500 Å is deposited thereon at about 300° C. by a P-CVD method, and then patterned by a photolithography method, thereby forming a second insulating film 225.

Then, a second metal layer (e.g., a Ti thin film) having a thickness of about 4000 Å is deposited over the entire surface of the substrate 221 by a sputtering method or the like, and then patterned by a photolithography method, thereby forming an upper electrode 226.

Subsequently, a transparent conductive film made of ITO or the like is deposited and then patterned, thereby forming a pixel electrode 227.

In this structure thus fabricated, the first insulating film 224 has nonlinear resistance characteristics and the switching element 228 is formed at the site where the lower electrode 223, the first insulating film 224 and the upper electrode 226 are stacked. The size of the switching element 228 is about 5 μm×5 μm. The capacitance ratio (the ratio of the capacitance of the liquid crystal layer to that of the element) of the liquid crystal display device is about 10:1.

In the structure shown in FIG. 19, stepped portions are formed around the peripheral portions of the signal line 222 and the lower electrode 223 and the adhesiveness between the first insulating film 224 and the second insulating film 225 becomes poor at the peripheral stepped portions. As a result, the etchant of the second insulating film 225 permeates the portion between the first insulating film 224 and the second insulating film 225 at an intersection R between the periphery of the signal line 222 and the periphery of the second insulating film 225 and then flows from the intersection R along the peripheral portions of the signal line 222 and the lower electrode 223 into the site S of the switching element 228.

However, according to the present invention, since the distance between the intersection R and the site S of the switching element 228 along the peripheral portions of the signal line 222 and the lower electrode 223 is set to be about 5 μm, which is sufficiently longer than the maximum distance which the flowing etchant of the second insulating film 225 can reach during etching the second insulating film 225. As a result, the etchant does not reach the site S of the switching element 228.

Thus, the second insulating film 225 is not eroded by the etchant at the periphery of the switching element 228 so that the possibility of the generation of an insulation breakdown in the switching element 228 can be reduced.

In this case, the taper angle θ (see FIG. 20) at the edges of the peripheral portions of the first insulating film 224 may also be set in a range from about 20° to about 80°.

Furthermore, the time required for etching the second insulating film 225 can be shortened without damaging the insulation properties of the second insulating film 225 because the thickness of the second insulating film 225 is set to be about 2500 Å.

EXAMPLE 7

Figure 21:
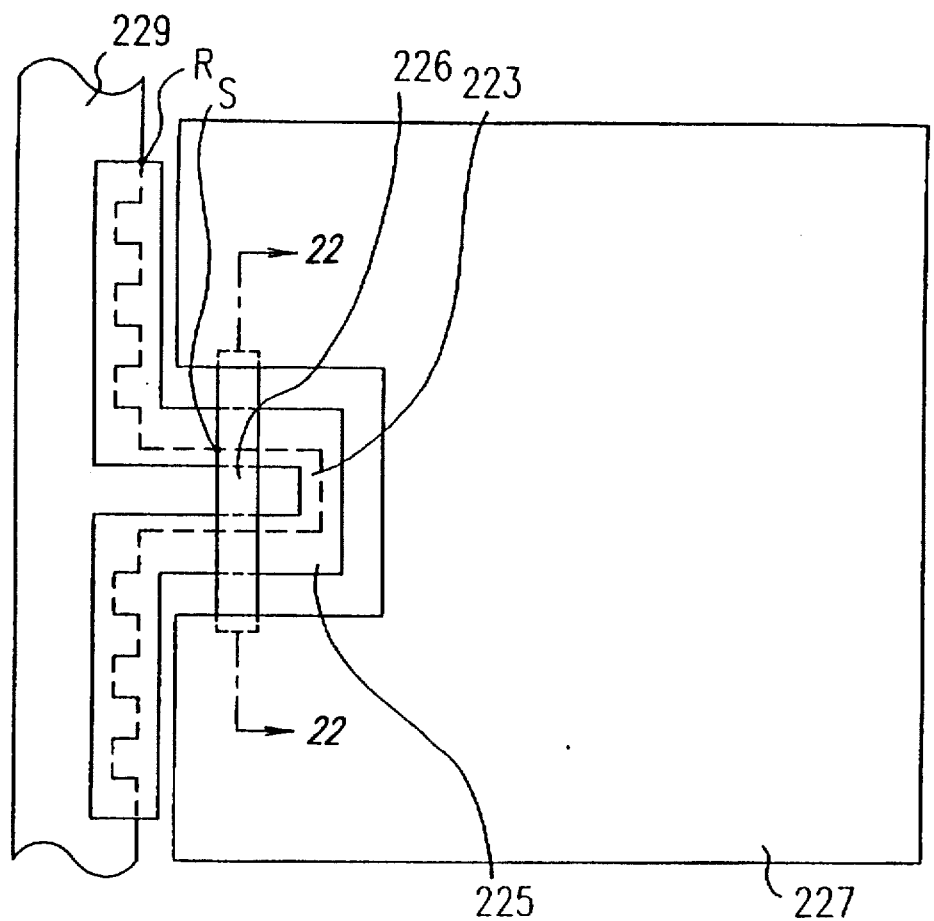
FIG. 21 is a plan view showing the switching element in the seventh example of the present invention.
Figure 22:
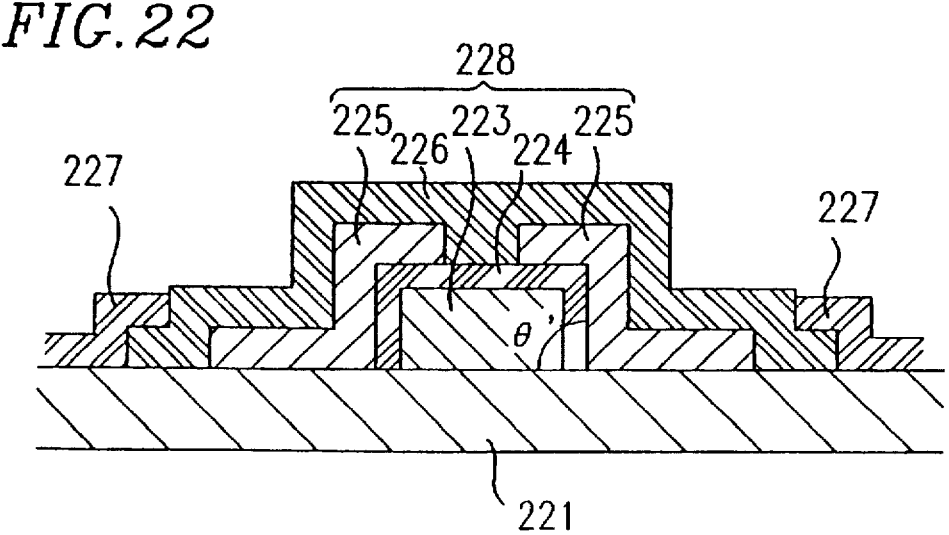
FIG. 22 is a cross-sectional view of the switching element taken along the line 22—22 shown in FIG. 21.

FIGS. 21 and 22 illustrate the switching element 228a in the seventh example of the present invention. FIG. 21 is a plan view of the switching element 228a, while FIG. 22 is a cross-sectional view of the switching element 228a taken along the line 22—22 shown in FIG. 21.

In this seventh example, a signal line 229 is provided instead of the signal line 222 shown in FIG. 19 and 20. The signal line 229 is characterized by including uneven portions in the periphery thereof.

In this configuration, the etchant of the second insulating film 225 also flows along the periphery of the signal line 229 during the etching process thereof. However, since the periphery of the signal line 229 is uneven, the etchant must go through the uneven portions. In other words, the path through which the etchant flows becomes longer. The etchant path can be made sufficiently long even if the size (or the width measured in the direction parallel to the signal line 229) of the second insulating film 225 is set to be smaller. As a result, the distance between the intersection R and the site S of the switching element 228a along the peripheral portions of the signal line 229 and the lower electrode 223 can be set to be equal to or longer than about 5 μm. In addition, if the uneven portions are provided in the periphery of the signal line 229, the etchant cannot reach the site S of the switching element 228a easily. As a result, the permeation of the etchant into the site S of the switching element 228a can be prevented more surely.

In this case, the taper angle θ (see FIG. 22) at the edges of the peripheral portions of the first insulating film 224 may also be set in a range from about 20° to about 80°.

Furthermore, the time required for etching the second insulating film 225 can be shortened by setting the thickness of the second insulating film 225 to be about 2500 Å without damaging the insulation properties of the second insulating film 225.

It should be understood that the present invention is not limited to the foregoing specific examples, but may be modified in various manners. For examples, the patterns of the signal line, the lower electrode, the first insulating film, the second insulating film and the upper electrode may be changed into various other shapes and various other appropriate materials may be used for these lines, films and electrodes.

In order to confirm the effects of the present invention, the present inventors measured the possibility of the generation of defects in switching elements having various configurations under the respective conditions.

The following Table 2 shows the possibilities of the generation of defects corresponding to various values of the distance from the intersection R which the etchant starts to permeate to the site S of the switching element 218 in the case where the signal line, the respective electrodes and the respective films were formed in the patterns shown in FIG. 12A. In this case, the distance was varied one μm by one μm in a range from about 2 μm to about 10 μm and the taper angle θ at the periphery of the signal line and the lower electrode was set to be constant.

TABLE 2

| Shortest distance (μm) | 2 | 3 | 4 | 5 | 6 | 7 | 10 |
|---|---|---|---|---|---|---|---|
| Number of defects | 104 | 63 | 11 | 0 | 0 | 0 | 0 |

The following Table 3 shows the possibilities of the generation of defects corresponding to various v flues of the distance from the intersection R which the etchant starts to permeate to the site S of the switching element 218a in the case of employing the patterns shown in FIG. 17. In this case, the distance was also varied one μm by one μm in a range from about 2 μm to about 10 μm and the taper angle θ at the periphery of the signal line and the lower electrode was set to be constant.

TABLE 3

| Shortest distance (μm) | 2 | 3 | 4 | 5 | 6 | 7 | 10 |
|---|---|---|---|---|---|---|---|
| Number of defects | 124 | 75 | 32 | 0 | 0 | 0 | 0 |

The following Table 4 shows the possibilities of the generation of defects corresponding to various values of the distance from the intersection R which the etchant starts to permeate to the site S of the switching element 228 in the case of employing the patterns shown in FIG. 19. In this case, the distance was also varied one μm by one μm in a range from about 2 μm to about 10 μm and the taper angle at the periphery of the signal line and the lower electrode was set to be constant.

TABLE 4

| Shortest distance (μm) | 2 | 3 | 4 | 5 | 6 | 7 | 10 |
|---|---|---|---|---|---|---|---|
| Number of defects | 109 | 89 | 56 | 0 | 0 | 0 | 0 |

The following Table 5 shows the possibilities of the generation of defects corresponding to various values of the distance from the intersection R which the etchant starts to permeate to the site S of the switching element 228a in the case of employing the patterns shown in FIG. 21. In this case, the distance was also varied one μm by one μm in a range from about 2 μm to about 10 μm and the taper angle θ at the periphery of the signal line and the lower electrode was set to be constant.

TABLE 5

| Shortest distance (μm) | 2 | 3 | 4 | 5 | 6 | 7 | 10 |
|---|---|---|---|---|---|---|---|
| Number of defects | 117 | 78 | 37 | 0 | 0 | 0 | 0 |

As is clear from Tables 2 to 5, the possibility of the generation of defects is decreased when the distance from the intersection R which the etchant starts to permeate to the site S of the switching element is about 5 μm or longer.

The following Table 6 shows the possibilities of the generation of defects corresponding to various values of the taper angle θ at the periphery of the signal line and the lower electrode, in the case of employing the patterns shown in FIG. 12A. In this case, the taper angle θ was varied by 5 degrees in a range from about 10° to about 90° and the distance from the intersection R which the etchant starts to permeate to the site S of the switching element 218 was set to be constant.

TABLE 6

| Taper Angle (degrees) | 10 | 15 | 20 | 45 | 80 | 85 | 90 |
|---|---|---|---|---|---|---|---|
| Number of defects | 385 | 262 | 0 | 0 | 0 | 196 | 206 |

The following Table 7 shows the possibilities of the generation of defects corresponding to various values of the taper angle θ at the periphery of the first insulating film, in the case of employing the patterns shown in FIG. 19. In this case, the taper angle θ was varied by 5 degrees in a range from about 10° to about 90° and the distance from the intersection R which the etchant starts to permeate to the site S of the switching element 228 was set to be constant.

TABLE 7

| Taper Angle (degrees) | 10 | 15 | 20 | 45 | 80 | 85 | 90 |
|---|---|---|---|---|---|---|---|
| Number of defects | 444 | 113 | 0 | 0 | 0 | 97 | 156 |

As is clear from Tables 6 and 7, the possibility of the generation of defects is decreased when the taper angle θ at the periphery of the signal line and the lower electrode or the taper angle θ at the periphery of the first insulating film is in a range from about 20° to about 80°.

The following Table 8 shows the possibilities of the generation of defects corresponding to various thickness values of the second insulating film made of silicon nitride in the case of employing the patterns shown in FIG. 12A. In this case, the film thickness of the second insulating film was varied in a range from about 300 Å to about 4000 Å. It is noted that the taper angle θ at the periphery of the signal line and the lower electrode was set to be constant and the distance from the intersection R which the etchant starts to permeate to the site S of the switching element 218 was also set to be constant.

TABLE 8

| Thickness (Å) | 300 | 800 | 1000 | 2000 | 3000 | 3500 | 4000 |
|---|---|---|---|---|---|---|---|
| Number of defects | 513 | 277 | 0 | 0 | 0 | 177 | 334 |

The following Table 9 shows the possibilities of the generation of defects corresponding to various thickness values of the second insulating film made of silicon oxide in the case of employing the patterns shown in FIG. 12A. In this case, the film thickness of the second insulating film was varied in a range from about 300 Å to about 4000 Å. It is noted that the taper angle θ at the periphery of the signal line and the lower electrode was set to be constant and the distance from the intersection R which the etchant starts to permeate to the site S of the switching element 218 was also set to be constant.

TABLE 9

| Thickness (Å) | 300 | 800 | 1000 | 2000 | 3000 | 3500 | 4000 |
|---|---|---|---|---|---|---|---|
| Number of defects | 489 | 263 | 0 | 0 | 0 | 93 | 233 |

As is clear from Tables 8 and 9, the possibility of the generation of defects is decreased when the thickness of the second insulating film is in a range from about 1000 Å to about 3000 Å.

According to the present invention, even when an etchant permeates a portion between a first metal layer and a second insulating film or a portion between a first insulating film and a second insulating film from an intersection between the pattern periphery of the first metal layer and the pattern periphery of the second insulating film and then flows from the intersection along the pattern periphery of the first metal layer toward the site of a switching element, the distance of the etchant path from the intersection to the site of the switching element is set to be sufficiently long. As a result, the etchant does not reach the site of the switching element during the etching process.

In addition, since uneven portions are formed in the pattern periphery of the first metal layer, the etchant must go through the uneven portions so that the path through which the etchant flows becomes longer. As a result, the etchant cannot reach the site of the switching element easily. Consequently, the permeation of the etchant into the site of the switching element can be prevented more surely.

Moreover, since the taper angle at the edge of the pattern periphery of the first metal layer overlapping the second insulating film or the taper angle at the edge of the pattern periphery of the first insulating film overlapping the second insulating film is set in a range from about 20° to about 80°, the adhesiveness between the pattern of the first metal layer and the second insulating film or the adhesiveness between the first insulating film and the second insulating film at the pattern periphery of the first metal layer can be improved. Consequently, the permeation of the etchant into the site of the switching element can be prevented more surely.

Furthermore, since the thickness of the second insulating film is set in a range from about 1000 Å to about 3000 Å, the time required for etching the second insulating film can be shortened without damaging the insulation properties of the second insulating film. As a result, the etching process can be finished before the etchant reaches the site of the switching element.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising a pair of substrates and a liquid crystal layer sandwiched between the pair of substrates, a plurality of pixel electrodes being arranged in a matrix on the surface facing the liquid crystal layer of at least one of the pair of substrates, a plurality of signal lines and a plurality of two-terminal nonlinear elements being formed such that an individual one of the two-terminal nonlinear elements is connected to one of the pixel electrodes which is associated with the individual two-terminal nonlinear element and one of the signal lines which is associated with the individual two-terminal nonlinear element, wherein the two-terminal nonlinear element comprises: a lower electrode connected to the associated signal line, an insulator formed so as to cover the lower electrode, and an upper electrode connected to the associated pixel electrode, wherein the insulator comprises a first insulating film exhibiting non-linearity and a second insulating film being formed so as to cover etching edges of the lower electrode and having a slit for electrically connecting the upper electrode to the first insulating film, the slit including a slit length extending in a first direction substantially parallel to the etching edges of the lower electrode and a slit width extending in a second direction substantially perpendicular to the first direction, and wherein the upper electrode includes a rectangular-shaped portion partially overlapping the slit, a length of the rectangular-shaped portion of the upper electrode extending substantially parallel to the second direction and a width of the rectangular-shaped portion of the upper electrode extending substantially parallel to the first direction.

2. A liquid crystal display device according to claim 1, wherein the lower electrode of the two-terminal nonlinear element is a part of the associated signal line and the two-terminal nonlinear element is formed just above the associated signal line.

3. A liquid crystal display device according to claim 1, wherein the second insulating film of the two-terminal nonlinear element is a film made of either a metal nitride or a metal oxide, an organic insulating film or a multilayer film thereof.

4. A liquid crystal display device according to claim 1, wherein the upper electrode is extended in a manner so that the portion of the slit on both sides of the upper electrode is not overlapped by the upper electrode.

5. A method for fabricating a liquid crystal display device comprising a pair of substrates and a liquid crystal layer sandwiched between a pair of substrates, a plurality of pixel electrodes being arranged in a matrix on the surface facing the liquid crystal layer of at least one of the pair of substrates, a plurality of signal lines and a plurality of two-terminal nonlinear elements being formed such that an individual one of the two-terminal nonlinear elements is connected to one of the pixel electrodes which is associated with the individual two-terminal nonlinear element and one of the signal lines which is associated with the individual two-terminal nonlinear element, wherein a process for forming the individual two-terminal nonlinear element comprises the steps of:

forming a lower electrode connected to the associated signal line;

forming a second insulating film having a slit over the lower electrode, the second insulating film being formed so as to cover both edges of the lower electrode which has been etched linearly and the slit being formed over the upper surface of the lower electrode and having a slit length extending in a first direction substantially parallel to the edges of the lower electrode which have been etched linearly and a slit width extending in a second direction substantially perpendicular to the first direction;

forming a first insulating film having a non-linearity by anodizing at least the upper surface of the lower electrode; and forming an upper electrode linearly so as to cross a portion of the slit of the second insulating film at a right angle, the upper electrode including a rectangular-shaped portion crossing the portion of the slit, the rectangular-shaped portion having a length extending substantially parallel to the second direction and a width extending substantially parallel to the first direction.

6. A method for fabricating a liquid crystal display device according to claim 5, wherein the second insulating film is made of silicon nitride and a formation voltage for anodizing the upper surface of the lower electrode is set to be in a range from about 20 V to about 35 V, both inclusive.

7. A method for fabricating a liquid crystal display device according to claim 5, wherein a relationship between a capacitance $C_{MIM}$ formed by the lower electrode, the first insulating film having non-linearity and the upper electrode and a capacitance $C_{add}$ formed by the lower electrode, the second insulating film and the upper electrode is given by: $C_{add} \leq 0.25 \times C_{MIM}$.

8. A method for fabricating a liquid crystal display device according to claim 5, wherein the second insulating film is a film made of either a metal nitride or a metal oxide, an organic insulating film or a multilayer film thereof.

9. A method for fabricating a liquid crystal display device according to claim 5, wherein the upper electrode is extended in a manner so that a portion of the slit on both sides of the upper electrode is not overlapped by the upper electrode.

10. A method for fabricating a liquid crystal display device comprising a pair of substrates and a liquid crystal layer sandwiched between the pair of substrates, a plurality of pixel electrodes being arranged in a matrix on the surface facing the liquid crystal layer of at least one of the pair of substrates, a plurality of signal lines and a plurality of two-terminal nonlinear elements being formed such that an individual one of the two-terminal nonlinear elements is connected to one of the pixel electrodes which is associated with the individual two-terminal nonlinear element and one of the signal lines which is associated with the individual two terminal element, wherein a process for forming the individual two-terminal nonlinear element comprises the steps of:

forming a lower electrode connected to the associated signal line;

forming a first insulating film having non-linearity by an anodization method at least on an upper surface of the lower electrode;

forming a second insulating film having a slit over the upper surface of the lower electrode, the second insulating film being formed at such a temperature as not to affect the non-linearity of the first insulating film and being deposited so as to cover both edges of the lower electrode which has been etched linearly and the slit being provided over the upper surface of the lower electrode and having a slit length extending in a first direction substantially parallel to the edges of the lower electrode which have been etched linearly and a slit width extending in a second direction substantially perpendicular to the first direction; and forming an upper electrode linearly so as to cross a portion of the slit of the second insulating film at a right angle, the upper electrode including a rectangular-shaped portion crossing the portion of the slit, the rectangular-shaped portion having a length extending substantially parallel to the second direction and a width extending substantially parallel to the first direction.

11. A method for fabricating a liquid crystal display device according to claim 10, wherein a relationship between a capacitance $C_{MIM}$ formed by the lower electrode, the first insulating film having non-linearity and the upper electrode and a capacitance Cadd formed by the lower electrode, the first insulating film, the second insulating film and the upper electrode is given by: $C_{add} \leq 0.25 \times C_{MIM}$.

12. A method for fabricating a liquid crystal display device according to claim 10, wherein the second insulating film is formed at a temperature equal to or lower than about 250° C.

13. A method for fabricating a liquid crystal display device according to claim 10, wherein the upper electrode is extended in a manner so that a portion of the slit on both sides of the upper electrode is not overlapped by the upper electrode.

14. A switching element having a multilayer structure comprising: a first metal layer; a first insulating film having nonlinear resistance properties; a second insulating film having insulation properties; and a second metal layer, the first metal layer and the second metal layer overlapping at a site of the switching element via the first insulating film, wherein the second insulating film is formed so as to cover a pattern periphery of the first metal layer, and wherein a distance along the pattern periphery of the first metal layer from an intersection between the pattern periphery of the first metal layer and a pattern periphery of the second insulating film to the site of the switching element is longer than a distance by which an etchant is able to penetrate from the intersection into the site of the switching element along the pattern periphery of the first metal layer when the second insulating film is etched.

15. A switching element according to claim 14, wherein the distance along the pattern periphery of the first metal layer from the intersection between the pattern periphery of the first metal layer and the pattern periphery of the second insulating film to the site of the switching element is equal to or longer than about 5 μm.

16. A switching element according to claim 14, wherein uneven portions are formed in the pattern periphery of the first metal layer from the intersection between the pattern periphery of the first metal layer and the pattern periphery of the second insulating film to the site of the switching element.

17. A switching element according to claim 14, wherein a taper angle at an edge of the pattern periphery of the first metal layer overlapping the second insulating film is in a range from about 20° to about 80°.

18. A switching element according to claim 14, wherein a taper angle at an edge of a pattern periphery of the first insulating film overlapping the second insulating film is in a range from about 20° to about 80°.

19. A switching element according to claim 14, wherein a film thickness of the second insulating film is in a range from about 1000 Å to about 3000 Å, including 1000 Å and 3000 Å.

* * * * *